US009544844B2

United States Patent
Sugitani

(10) Patent No.: US 9,544,844 B2
(45) Date of Patent: Jan. 10, 2017

(54) WIRELESS COMMUNICATION APPARATUS AND WIRELESS COMMUNICATION SYSTEM

(71) Applicant: Panasonic Intellectual Property Management Co., Ltd., Osaka (JP)

(72) Inventor: Toshiyuki Sugitani, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 981 days.

(21) Appl. No.: 13/666,617

(22) Filed: Nov. 1, 2012

(65) Prior Publication Data

US 2013/0121223 A1 May 16, 2013

(30) Foreign Application Priority Data

Nov. 4, 2011 (JP) ................................. 2011-241900

(51) Int. Cl.
*H04W 52/02* (2009.01)
*H04W 88/02* (2009.01)

(52) U.S. Cl.
CPC ......... *H04W 52/02* (2013.01); *H04W 52/0274* (2013.01); *H04W 52/028* (2013.01); *H04W 88/02* (2013.01)

(58) Field of Classification Search
CPC .... G06F 1/3203; G06F 1/3287; G06F 1/3275; Y02B 60/1225; H04W 52/00; H04W 52/028; H04W 52/0287; H04W 52/02; H04W 52/0209; H04W 52/0235; H04W 52/0261; H04W 52/0274
See application file for complete search history.

(56) References Cited

U.S. PATENT DOCUMENTS 8,423,092 B2 4/2013 Caskey
2006/0059380 A1* 3/2006 Kimura ............... G06F 11/1441
713/323

(Continued)

FOREIGN PATENT DOCUMENTS

CN 101656429 A 2/2010
DE 42 44 858 A1 10/1995

(Continued)

OTHER PUBLICATIONS

Extended European Search Report dated Feb. 26, 2015, for corresponding EP Application No. 12845781.9-1855 / 2774289, 6 pages.

(Continued)

*Primary Examiner* — Un C Cho
*Assistant Examiner* — Oussama Roudani
(74) *Attorney, Agent, or Firm* — Seed IP Law Group LLP

(57) ABSTRACT

A wireless communication apparatus operates in tributary to a control station that performs a time division multiplex communication. The wireless communication apparatus includes a switch unit that switches on/off a power supplied from a battery; a power supply control unit that controls the switch unit; a RAM to which a power is constantly supplied from the battery; a control unit that receives the power supplied through the switch unit. The control unit writes information for determining an operating state in the RAM when being shifted to a standby state. The power supply control unit turns off the switch unit upon receiving a signal of a power supply off. When the control unit is re-supplied with the power through the switch unit, the control unit determines an operation based on the information for determining the operating state stored in the RAM.

9 Claims, 17 Drawing Sheets

(56) References Cited

U.S. PATENT DOCUMENTS

| | | | |
|---|---|---|---|
| 2007/0159321 A1* | 7/2007 | Ogata | A61B 5/0002 340/539.12 |
| 2008/0170526 A1* | 7/2008 | Narang | H04W 52/0216 370/311 |
| 2008/0175187 A1* | 7/2008 | Lowry | H04L 67/125 370/328 |
| 2011/0025490 A1 | 2/2011 | Egawa | |
| 2011/0101869 A1* | 5/2011 | Pope | G08C 17/02 315/132 |
| 2013/0122973 A1 | 5/2013 | Caskey | |

FOREIGN PATENT DOCUMENTS

| | | |
|---|---|---|
| JP | 5-88790 | 4/1993 |
| JP | 05-102900 | 4/1993 |
| JP | 2005-084803 | 3/2005 |
| JP | 2007-214898 | 8/2007 |
| JP | 2009-259228 | 11/2009 |
| WO | 93/06543 A1 | 4/1993 |
| WO | 2010/068869 | 6/2010 |

OTHER PUBLICATIONS

International Search Report dated Feb. 19, 2013.
English Translation of Notification of First Office Action and Search Report, dated Jul. 5, 2016, for corresponding CN Application No. 201280053740.0, 13 pages.

* cited by examiner

*FIG.6*

| SYNCHRONIZATION SIGNAL | CONTROL DATA 1 | ERROR DETECTION CODE 1 |
|---|---|---|

FIG. 7

| SYN-CHRONI-ZATION SIGNAL | CONTROL DATA 1 | ERROR DETEC-TION CODE 1 | CONTROL DATA 2 | ERROR DETEC-TION CODE 2 | CONTROL DATA 3 | ERROR DETEC-TION CODE 3 | CONTROL DATA 4 | ERROR DETEC-TION CODE 4 | CONTROL DATA 5 | ERROR DETEC-TION CODE 5 |

FIG.8

| Frame | Sync | Data | Error |
|---|---|---|---|
| FRAME NUMBER: 16 × N+0 | SYNCHRO-NIZATION SIGNAL | PT CALL INFORMATION | ERROR DETECTION CODE 1 |
| FRAME NUMBER: 16 × N+1 | SYNCHRO-NIZATION SIGNAL | NT MASTER UNIT IDENTIFICATION INFORMATION | ERROR DETECTION CODE 1 |
| FRAME NUMBER: 16 × N+2 | SYNCHRO-NIZATION SIGNAL | NT MASTER UNIT IDENTIFICATION INFORMATION | ERROR DETECTION CODE 1 |
| FRAME NUMBER: 16 × N+3 | SYNCHRO-NIZATION SIGNAL | NT MASTER UNIT IDENTIFICATION INFORMATION | ERROR DETECTION CODE 1 |
| FRAME NUMBER: 16 × N+4 | SYNCHRO-NIZATION SIGNAL | NT MASTER UNIT IDENTIFICATION INFORMATION | ERROR DETECTION CODE 1 |
| FRAME NUMBER: 16 × N+5 | SYNCHRO-NIZATION SIGNAL | NT MASTER UNIT IDENTIFICATION INFORMATION | ERROR DETECTION CODE 1 |
| FRAME NUMBER: 16 × N+6 | SYNCHRO-NIZATION SIGNAL | NT MASTER UNIT IDENTIFICATION INFORMATION | ERROR DETECTION CODE 1 |
| FRAME NUMBER: 16 × N+7 | SYNCHRO-NIZATION SIGNAL | NT MASTER UNIT IDENTIFICATION INFORMATION | ERROR DETECTION CODE 1 |
| FRAME NUMBER: 16 × N+8 | SYNCHRO-NIZATION SIGNAL | QT SYSTEM INFORMATION | ERROR DETECTION CODE 1 |
| FRAME NUMBER: 16 × N+9 | SYNCHRO-NIZATION SIGNAL | NT MASTER UNIT IDENTIFICATION INFORMATION | ERROR DETECTION CODE 1 |
| FRAME NUMBER: 16 × N+10 | SYNCHRO-NIZATION SIGNAL | NT MASTER UNIT IDENTIFICATION INFORMATION | ERROR DETECTION CODE 1 |
| FRAME NUMBER: 16 × N+11 | SYNCHRO-NIZATION SIGNAL | NT MASTER UNIT IDENTIFICATION INFORMATION | ERROR DETECTION CODE 1 |
| FRAME NUMBER: 16 × N+12 | SYNCHRO-NIZATION SIGNAL | NT MASTER UNIT IDENTIFICATION INFORMATION | ERROR DETECTION CODE 1 |
| FRAME NUMBER: 16 × N+13 | SYNCHRO-NIZATION SIGNAL | NT MASTER UNIT IDENTIFICATION INFORMATION | ERROR DETECTION CODE 1 |
| FRAME NUMBER: 16 × N+14 | SYNCHRO-NIZATION SIGNAL | NT MASTER UNIT IDENTIFICATION INFORMATION | ERROR DETECTION CODE 1 |
| FRAME NUMBER: 16 × N+15 | SYNCHRO-NIZATION SIGNAL | NT MASTER UNIT IDENTIFICATION INFORMATION | ERROR DETECTION CODE 1 |

FIG. 9

| SYN-CHRONI-ZATION SIGNAL | CONTROL DATA 1 | ERROR DETECTION CODE 1 | SOUND DATA | ERROR DETECTION CODE 6 |
|---|---|---|---|---|

FIG. 11

| | Synchronization Signal | | Error Detection Code 1 | Control Channel Information | Error Detection Code 2 | Space Channel Information | Error Detection Code 3 | Control Channel Information | Error Detection Code 4 | Space Channel Information | Error Detection Code 5 |
|---|---|---|---|---|---|---|---|---|---|---|---|
| FRAME NUMBER: 16×N+0 | Synchronization Signal | PT CALL INFORMATION | Error Detection Code 1 | Control Channel Information | Error Detection Code 2 | Space Channel Information | Error Detection Code 3 | Control Channel Information | Error Detection Code 4 | Space Channel Information | Error Detection Code 5 |
| FRAME NUMBER: 16×N+1 | Synchronization Signal | NT MASTER UNIT IDENTIFICATION INFORMATION | Error Detection Code 1 | Space Channel Information | Error Detection Code 2 | Control Channel Information | Error Detection Code 3 | Space Channel Information | Error Detection Code 4 | Control Channel Information | Error Detection Code 5 |
| FRAME NUMBER: 16×N+2 | Synchronization Signal | NT MASTER UNIT IDENTIFICATION INFORMATION | Error Detection Code 1 | Control Channel Information | Error Detection Code 2 | Space Channel Information | Error Detection Code 3 | Control Channel Information | Error Detection Code 4 | Space Channel Information | Error Detection Code 5 |
| FRAME NUMBER: 16×N+3 | Synchronization Signal | NT MASTER UNIT IDENTIFICATION INFORMATION | Error Detection Code 1 | Space Channel Information | Error Detection Code 2 | Control Channel Information | Error Detection Code 3 | Space Channel Information | Error Detection Code 4 | Control Channel Information | Error Detection Code 5 |
| FRAME NUMBER: 16×N+4 | Synchronization Signal | NT MASTER UNIT IDENTIFICATION INFORMATION | Error Detection Code 1 | Control Channel Information | Error Detection Code 2 | Space Channel Information | Error Detection Code 3 | Control Channel Information | Error Detection Code 4 | Space Channel Information | Error Detection Code 5 |
| FRAME NUMBER: 16×N+5 | Synchronization Signal | NT MASTER UNIT IDENTIFICATION INFORMATION | Error Detection Code 1 | Space Channel Information | Error Detection Code 2 | Control Channel Information | Error Detection Code 3 | Space Channel Information | Error Detection Code 4 | Control Channel Information | Error Detection Code 5 |
| FRAME NUMBER: 16×N+6 | Synchronization Signal | NT MASTER UNIT IDENTIFICATION INFORMATION | Error Detection Code 1 | Control Channel Information | Error Detection Code 2 | Space Channel Information | Error Detection Code 3 | Control Channel Information | Error Detection Code 4 | Space Channel Information | Error Detection Code 5 |
| FRAME NUMBER: 16×N+7 | Synchronization Signal | NT MASTER UNIT IDENTIFICATION INFORMATION | Error Detection Code 1 | Space Channel Information | Error Detection Code 2 | Control Channel Information | Error Detection Code 3 | Space Channel Information | Error Detection Code 4 | Control Channel Information | Error Detection Code 5 |
| FRAME NUMBER: 16×N+8 | Synchronization Signal | QT SYSTEM INFORMATION | Error Detection Code 1 | Control Channel Information | Error Detection Code 2 | Space Channel Information | Error Detection Code 3 | Control Channel Information | Error Detection Code 4 | Space Channel Information | Error Detection Code 5 |
| FRAME NUMBER: 16×N+9 | Synchronization Signal | NT MASTER UNIT IDENTIFICATION INFORMATION | Error Detection Code 1 | Space Channel Information | Error Detection Code 2 | Control Channel Information | Error Detection Code 3 | Space Channel Information | Error Detection Code 4 | Control Channel Information | Error Detection Code 5 |
| FRAME NUMBER: 16×N+10 | Synchronization Signal | NT MASTER UNIT IDENTIFICATION INFORMATION | Error Detection Code 1 | Control Channel Information | Error Detection Code 2 | Space Channel Information | Error Detection Code 3 | Control Channel Information | Error Detection Code 4 | Space Channel Information | Error Detection Code 5 |
| FRAME NUMBER: 16×N+11 | Synchronization Signal | NT MASTER UNIT IDENTIFICATION INFORMATION | Error Detection Code 1 | Space Channel Information | Error Detection Code 2 | Control Channel Information | Error Detection Code 3 | Space Channel Information | Error Detection Code 4 | Control Channel Information | Error Detection Code 5 |
| FRAME NUMBER: 16×N+12 | Synchronization Signal | NT MASTER UNIT IDENTIFICATION INFORMATION | Error Detection Code 1 | Control Channel Information | Error Detection Code 2 | Space Channel Information | Error Detection Code 3 | Control Channel Information | Error Detection Code 4 | Space Channel Information | Error Detection Code 5 |
| FRAME NUMBER: 16×N+13 | Synchronization Signal | NT MASTER UNIT IDENTIFICATION INFORMATION | Error Detection Code 1 | Space Channel Information | Error Detection Code 2 | Control Channel Information | Error Detection Code 3 | Space Channel Information | Error Detection Code 4 | Control Channel Information | Error Detection Code 5 |
| FRAME NUMBER: 16×N+14 | Synchronization Signal | NT MASTER UNIT IDENTIFICATION INFORMATION | Error Detection Code 1 | Control Channel Information | Error Detection Code 2 | Space Channel Information | Error Detection Code 3 | Control Channel Information | Error Detection Code 4 | Space Channel Information | Error Detection Code 5 |
| FRAME NUMBER: 16×N+15 | Synchronization Signal | NT MASTER UNIT IDENTIFICATION INFORMATION | Error Detection Code 1 | Space Channel Information | Error Detection Code 2 | Control Channel Information | Error Detection Code 3 | Space Channel Information | Error Detection Code 4 | Control Channel Information | Error Detection Code 5 |

FIG. 14

| SYNCHRO-NIZATION SIGNAL | CONTROL DATA 1 | ERROR DETECTION CODE 1 | CLMS1 | ERROR DETECTION CODE 2 | CLMS2 | ERROR DETECTION CODE 3 | CLMS3 | ERROR DETECTION CODE 4 | CLMS4 | ERROR DETECTION CODE 5 |

WIRELESS COMMUNICATION APPARATUS AND WIRELESS COMMUNICATION SYSTEM

BACKGROUND

1. Technical Field

The present invention relates to a wireless communication apparatus and a wireless communication system that are applicable to a sensor.

2. Background Art

Recently, for the purpose of effective usage of frequency resources, a part of the frequency band of a digital cordless phone becomes available for wireless communication of a sound communication device, such as a wireless intercom or a wireless sensor, or a data communication device. In this frequency band, wireless communication is authorized which is on the basis of a wireless communication method of the DECT (Digital Enhanced Cordless Telecommunications) standard that has been widespread as a communication method of a digital cordless phone in countries around the world, and with a wireless communication apparatus using this frequency band, the use of a device for inexpensive, commercially available wireless communication has been enabled for a DECT type digital cordless phone. Further, from the viewpoint of effective usage of frequency resources and user convenience, there is a need for the development of complex products, such as a digital cordless phone, a wireless intercom, and a wireless sensor.

The DECT standard adopts a TDMA (Time Division Multiple Access)/TDD (Time Division Duplex) method that is configured to include 24 slots (12 slots for uplink and 12 slots for downlink) in one frame having a cycle of 10 ms.

FIG. 1 shows DECT type frame and slot configurations. As shown in FIG. 1, the DECT type wireless communication controls designation of a slot position by assigning numbers, such as Slot: 1, Slot: 2, and the like, for respective slots that perform wireless communication. Further, one frame includes 24 slots that are from Slot: 1 to Slot: 24, and a frame number is given for every frame to perform communication control. One slot is allocated as a control channel, and 11 slot pairs are allocated as call channels. A control signal that is transmitted through the DECT type control channel includes a synchronization signal to achieve bit synchronization and slot timing synchronization, a master unit ID to identify a master unit, a slot number to achieve slot synchronization that is used for the designation of a communication slot or the like, a frame number to achieve synchronization of a frame number that is used for concealment control or the like, and an error detection code to determine existence/nonexistence of errors of control information that includes a destination notice or the like and received data.

The control information that is transmitted to the DECT type control channel is classified into four kinds of messages: an NT message to notify of a master unit ID that is master unit identification information, a QT message to notify of system information, such as a frame number, a master unit function, a communication frequency, a standby frequency, and the like, and to be used as a reference frame for multi-frame control, a PT message to notify of information related to paging, such as call information and phone number information of a called party for calling party number notification, and an MT message to notify of information related to wireless control that is performed in a MAC layer such as startup of a communication channel and handover. Further, the DECT type cordless phone does not transmit information of the contents with each frame every time, but transmits the control information dispersed over a plurality of frames by determining a unit to assume 16 frames as one period and transmitting one kind of message by one unit. A slave unit that is a tributary station performs intermittent reception control to perform reception operation in conformity to a slot for control, to which the control information is transmitted once per 16 frames. As described above, a multi-frame control is performed to divide the control information into the kinds (the NT message, QT message, PT message, and MT message) and to transmit the plurality of frames.

Since the TDMA type wireless communication apparatus is used by mobile communication or a cordless phone that is driven by a battery, many techniques for low power consumption are disclosed. For example, JP-A-5-102900 discloses a battery saving method by intermittent reception using control channel control through spurious frame configuration and variable control of an intermittent reception period. According to the method in JP-A-5-102900, a master unit intermittently performs on/off control of the power supply of a slave unit in a manner that the master unit generates a counter set value signal that designates an on/off period of the power supply and multiplexes the counter set value signal in a time slot of each frame to transmit the multiplexed counter set value signal to the slave unit, and the slave unit loads and counts the counter set value with a counter and makes the power supply of the slave unit itself into an off state until the counter becomes a predetermined value. In addition, JP-A-5-102900 further discloses changing of the on/off period of the power supply depending on time.

On the other hand, a sensor device, which is used for a fire detector or a window opening and closing monitoring device, has been developed to have a wireless communication function that is driven by a battery, in view of easy of the installation, and many techniques for low power consumption are disclosed. For example, JP-A-2005-84803 discloses a technique to suppress power consumption by performing communication through supplying power to a wireless unit only when it is determined that wireless communication is necessary from a sensor device and to improve reliability of the wireless communication by controlling a transmission interval or the number of transmissions. Further, JP-A-2009-259228 discloses a method in which a battery-driven warning device notifies a user of instances of low battery.

Further, JP-A-2007-214898 discloses a technique to make it possible to perform immediate return from a power-saving mode to another state by realizing a power-saving mode through providing of a sleep mode in which data is maintained although access is not possible, and using SDRAM as a save area for information that would cause trouble if it is lost during sleeping of a communication system processor in a portable wireless communication terminal that is divided into an application system processor and the communication system processor.

SUMMARY

In a wireless communication system which performs voice call or image communication in a TDMA wireless communication method on the premises (general houses or facilities), typically, a tributary station (a phone slave unit, a door phone slave unit, an entrance camera, or the like) is required to maintain synchronization with a control station while receiving a control signal from the control station. In a case where a wireless sensor function is added to this system, of existing wireless sensors, for example, a sensor based on the premise of notifying of information where a frequency of abnormality detection is small such as fire detection may be synchronized with the control station in the same wireless communication method as in a tributary station in the related art. In other words, if the wireless communication method in the related art is used without modification, even in a standby state, that is, a state where wireless communication from the sensor device is not necessary, the sensor device receives a control signal from the control station in order to maintain synchronization of transmission and reception timing with the control station. When abnormality is detected, the sensor device establishes wireless link with the control station and performs an operation of sending information to the control station during the wireless link.

In a case of combining a type of wireless sensor device which issues detection information every time a door is opened and closed or people come and go, with a system which is synchronized with the control station using the same wireless communication method, wireless link with the control station is established for each detection, and an operation of sending information to the control station is performed during the wireless link. In this case, even if battery saving is performed by intermittent reception control, in a case of the type of issuing detection information frequently as such, a power consumption amount cannot be disregarded. If a wireless phone or a wireless door phone having a wireless sensor function of frequently issuing detection information is to be implemented, communication in a wireless communication method different from the TDMA wireless communication method used for voice call and the like in the related art is necessary when power consumption is taken into consideration, and thus there is a problem in that wireless circuits become complicated.

In addition, JP-A-2009-259228 discloses a method of notifying another device of a battery level and notifying a user thereof using wireless communication in a battery-driven wireless sensor; however, low power consumption is not taken into consideration in retransmission control when trouble occurs in the wireless communication for notifying of the battery level, and, in a case where a battery level becomes equal to or less than a defined value and communication trouble occurs during wireless communication for notifying a user of battery exchange, power is rapidly consumed due to the retransmission control, and thus there is in high danger to reach communication failure in a state where wireless communication for notifying of a necessity for battery exchange due to the low battery level is unable to be performed.

The present invention has been made in consideration of these problems, and an object thereof is to provide a wireless communication apparatus which is applicable to a wireless sensor using a TDMA method, has low power consumption, and is strong on hindrance due to wireless interference.

An aspect of the present invention provides a wireless communication apparatus which operates in tributary to a control station that performs a time division multiplex communication, the wireless communication apparatus including: a switch unit that switches on/off a power supplied from a battery; a power supply control unit that controls the switch unit; a RAM (Random Access Memory) to which a power is constantly supplied from the battery; a wireless unit that receives a power supplied through the switch unit and performs a wireless communication with the control station; and a control unit that receives the power supplied through the switch unit, wherein the control unit writes information for determining an operating state of the wireless communication apparatus in the RAM when the control unit that has performed the wireless communication once via the wireless unit is shifted to a standby state, the power supply control unit turns off the switch unit upon receiving a signal of a power supply off, and when the switch unit is turned on to supply the power to the control unit through the switch unit, the control unit determines an operation based on the information for determining the operating state that is stored in the RAM.

According to the aspect of the present invention, in the TDMA communication method, the tributary station can transmit and receive a message depending on an event with the control station with a small number of slots, and thus power consumption of the tributary station can be reduced.

BRIEF DESCRIPTION OF THE DRAWINGS

FIG. 6 is a diagram illustrating a data format of a control signal in the case where only a phone slave unit is registered in a master unit illustrated in FIG. 2.

FIG. 7 is a diagram illustrating a data format of a control signal in the case where a sensor slave unit is registered in a master unit illustrated in

FIG. 2.

FIG. 8 is a diagram illustrating the kinds and transmission order of control signals in the case where only a phone slave unit is registered in a master unit illustrated in FIG. 2.

FIG. 9 is a diagram illustrating a data format of a signal that is used in a case where a master unit and a phone slave unit illustrated in FIG. 2 communicate with each other.

FIG. 11 is a diagram illustrating the kinds and transmission order of control signals in the case where a sensor slave unit is registered in a master unit illustrated in FIG. 2.

FIG. 14 is a diagram illustrating a data format of a signal that is used in the case where a master unit and a sensor slave unit illustrated in FIG. 2 communicate with each other.

Figure 2:
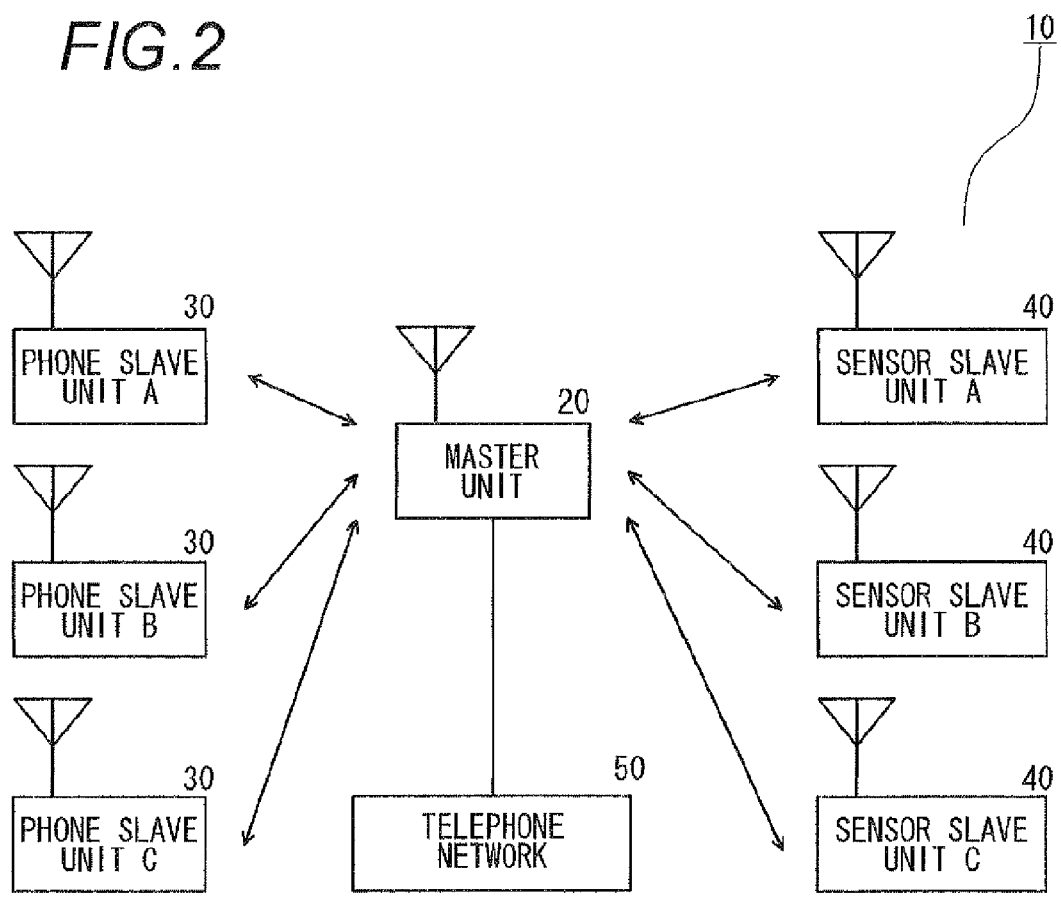
FIG. 2 is a diagram illustrating a wireless communication apparatus according to a first embodiment of the present invention.
Figure 17:
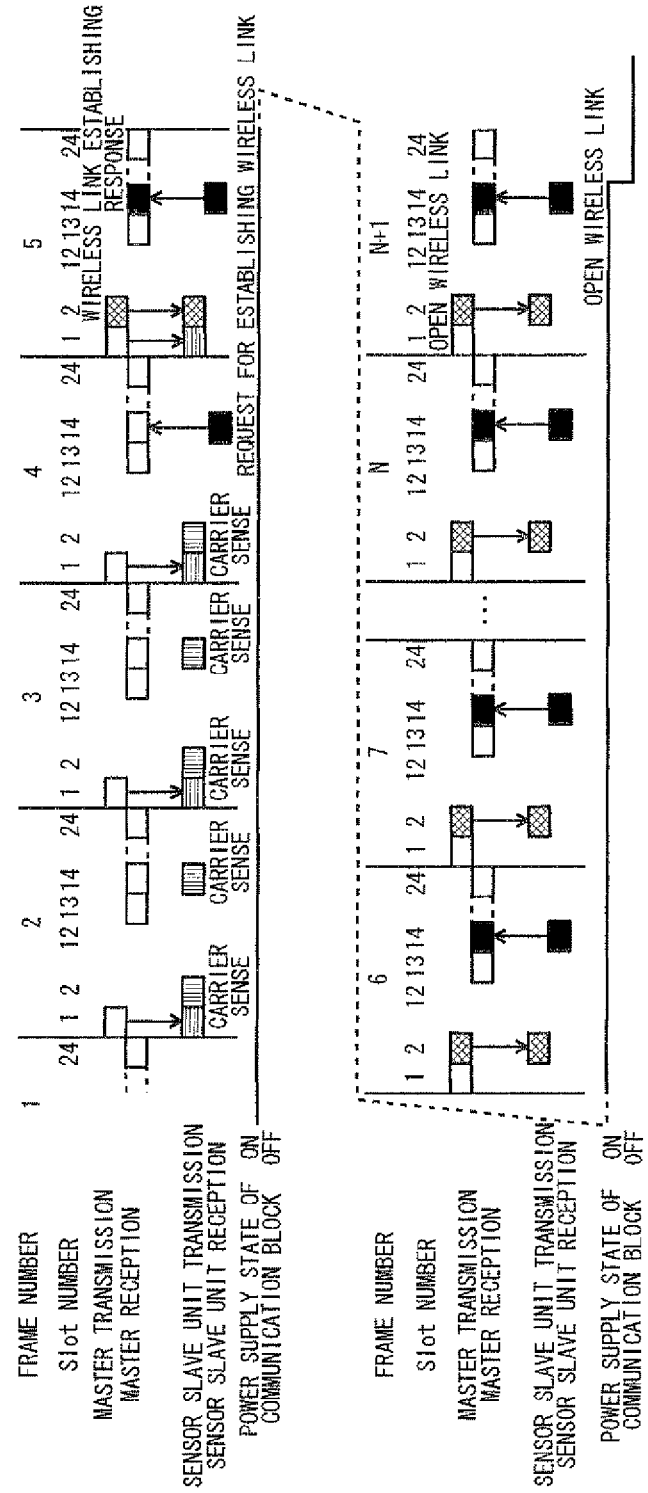

FIG. 17 is a diagram illustrating an example of the operation in which a sensor slave unit illustrated in FIG. 2 establishes interactive wireless re-synchronization with a master unit and notifies of a window state.

DETAILED DESCRIPTION

A first aspect of the present invention provides a wireless communication apparatus (a slave unit) which operates in tributary to a control station (a master unit) that performs a time division multiplex communication, the wireless communication apparatus including: a switch unit that switches on/off a power supplied from a battery; a power supply control unit that controls the switch unit; a RAM (Random Access Memory) to which a power is constantly supplied from the battery; a wireless unit that receives a power supplied through the switch unit and performs a wireless communication with the control station; and a control unit that receives the power supplied through the switch unit, wherein the control unit writes information for determining an operating state of the wireless communication apparatus in the RAM when the control unit that has performed the wireless communication once via the wireless unit is shifted to a standby state and then outputs a signal of power supply off to the power supply control unit, the power supply control unit turns off the switch unit upon receiving the signal of power supply off, and when the switch unit is turned on to supply the power to the control unit through the switch unit, the control unit determines an operation based on the information for determining the operating state that is stored in the RAM.

According to the first aspect of the present invention, in a standby state where communication is unnecessary, power supplied to the wireless unit or the control unit and necessary for wireless communication is cut off, and thereby it is possible to remove power consumption in these units in the standby state and to thereby reduce battery consumption. In addition, the RAM to which power supply is not turned off during the standby state stores and maintains information that would trouble if lost, thereby control of storing and reading of information is easily performed so as to improve the response as compared with a case of using a storage device such as EEPROM, and thus it is possible to reduce power consumption while the process is performed. Further, even if the number of writings is large, it is not necessary to consider the limited number of writings as in the use of the storage device such as EEPROM, thereby securing the long-term reliability.

A second aspect of the present invention provides a wireless communication apparatus, in addition to the first aspect, further including an event detection unit that detects a predetermined event, wherein when the event detection unit detects the event, the event detection unit notifies the power supply control unit of an event detection, the power supply control unit turns on the switch unit upon receiving a notification of the event detection from the event detection unit, when the control unit is supplied with the power through the switch unit, the control unit starts the wireless unit, and when synchronization for performing the time division multiplex communication with the master unit is established, the control unit notifies the master unit of a message corresponding to an occurrence of the event and writes information indicating that a notification of the message is completed in the RAM, and then outputs the signal of power supply off to the power supply control unit, but when the synchronization with the master unit is not established, the control unit writes information indicating that an establishment of the synchronization has failed in the RAM, and then outputs the signal of power supply off to the power supply control unit, and when the information indicating that the establishment of the synchronization has failed is written in the RAM in an operation by the control unit to establish the synchronization with the master unit, the control unit shortens a limit time until it is considered that the establishment of the synchronization has failed in comparison with a case where information indicating a normal end is written in the RAM.

According to the second aspect of the present invention, in a case where a message is unable to be transmitted due to not being synchronized with a master unit, since control is performed so as to shorten the time limit of synchronization establishment for the next starting, it is possible to reduce power consumption even in a case where a state where synchronization is not performed for a long time continues in a state where power supply to the master unit is turned off.

A third aspect of the present invention provides a wireless communication apparatus, in addition to the first or second aspect, further including a timer unit that measures a time period depending on a given setting, wherein the control unit sets a standby time for predetermined retransmission control in the timer unit when a communication with the master unit is failed, and the timer unit notifies the power supply control unit of a timer expiration when the set standby time elapses, and the power supply control unit turns on the switch unit upon receiving a notification of the timer expiration from the timer unit to operate to communicate with the master unit again.

According to the third aspect of the present invention, in a case where transmission of a message with the master unit is unable to be performed, power supplied to the wireless unit and the control unit is cut off in the standby state until retransmission control starts, and thereby it is possible to remove power consumption in these units in the standby state and to thereby reduce battery consumption.

A fourth aspect of the present invention provides a wireless communication apparatus, in addition to the above aspects, wherein when a communication with the master unit is failed, the control unit writes information indicating the number of starts for retransmission in the RAM and determines the standby time for the retransmission control depending on the number of starts for the retransmission.

According to the fourth aspect of the present invention, since a standby time between retransmissions is changed depending on the number of retransmissions to be started, in a case where a state where communication is unable to be performed continues and thus retransmissions are repeatedly performed, it is possible to decrease the number of wasteful retransmissions and to thereby reduce battery consumption when the retransmissions occur.

A fifth aspect of the present invention provides a wireless communication apparatus, in addition to the above aspects, wherein when notification of a message has failed after the establishment of the synchronization with the master unit, the control unit writes information to notify of non-transmission of the message in the RAM, and then outputs the signal of power supply off to the power supply control unit, and when the retransmission of the message fails in the start for the retransmission, the control unit reduces the number of retries of the transmission of the message.

According to the fifth aspect of the present invention, in a case where a message is unable to be transmitted for some reasons after synchronization with the master unit is established, since control is performed so as to shorten the number of retries of a message transmission operation at the next starting, in a case where a state of being unable to perform communication of a message occurs while the master unit communicates with other slave units, or in a case where communication using the same wireless band in the surroundings is performed, a state where wireless resources for communication fall short occurs, and thereby a state of being unable to perform communication of a message continues, it is possible to reduce battery consumption.

A sixth aspect of the present invention provides a wireless communication apparatus, in addition to the above aspects, wherein the control unit operates to stop the retransmission control when the number of starts for the retransmission reaches a predetermined number of times.

According to the sixth aspect of the present invention, since retransmission control is stopped with a specific number of times, it is possible to reduce battery consumption in a case where a state of being unable to perform communication continues.

A seventh aspect of the present invention provides a wireless communication apparatus, in addition to the above aspects, further including a battery voltage detection unit that detects a battery voltage of the battery, wherein the control unit detects the battery voltage while the communication is established with the master unit, and notifies the master unit of information on the battery voltage.

According to the seventh aspect of the present invention, since a notification of information according to a battery voltage is sent to a control station during communication, the control station can grasp a battery state of a tributary station, thus the control station can notify a user of the battery state of the tributary station, and thereby convenience is improved. Particularly, the control station can perform a notification for prompting to exchange batteries of the tributary station, thus the battery of the tributary station is not consumed in order to perform the notification for prompting to exchange batteries of the tributary station, and thereby the time for use of the battery in a reduced battery state is lengthened. Therefore, convenience is improved.

An eighth aspect of the present invention provides a wireless communication apparatus, in addition to the above aspects, wherein the control unit sets a standby time until a predetermined monitoring time of the battery voltage in the timer unit, the timer unit notifies the power supply control unit of a timer expiration when the standby time elapses, the power supply control unit turns on the switch unit upon receiving a notification of the timer expiration to supply the power through the switch unit, and the control unit notifies the master unit of the information on the battery voltage.

According to the eighth aspect of the present invention, power supplied to the wireless unit and the control unit is cut off in the standby state other than the time when a notification of information regarding a battery voltage is sent, and thereby it is possible to reduce battery consumption in the standby state.

A ninth aspect of the present invention provides a wireless communication apparatus, in addition to the above aspects, wherein the control unit has a threshold value to determine whether or not to notify of the information on the battery voltage, and the control unit notifies the control station of the information on the battery voltage when the battery voltage becomes equal to or lower than the threshold value.

According to the ninth aspect of the present invention, since communication is started only in a case where a battery voltage is equal to or less than a preset threshold value, it is possible to suppress battery consumption without damaging the convenience for the control station to notify a user of battery exchange.

A tenth aspect of the present invention provides a wireless communication apparatus, in addition to the above aspects, wherein the control unit has a threshold value to determine whether or not to notify of the information on the battery voltage, the control unit notifies the master unit of the information on the battery voltage when the battery voltage becomes equal to or lower than the threshold value, and when the notification of the information on the battery voltage to the master unit is completed, the control unit writes information indicating that the notification of the information on the battery voltage to the master unit is completed in the RAM, and if the information indicating that the notification of the information on the battery voltage to the master unit is completed is not written in the RAM, the control unit notifies the master unit of the information on the battery voltage and an operation to detect the battery voltage.

According to the tenth aspect of the present invention, since the tributary station performs a notification only once in a case where a battery voltage is equal to or less than a threshold value, it is possible to suppress battery consumption without damaging the convenience for the control station to notify a user of battery exchange.

An eleventh aspect of the present invention provides a wireless communication system including a control station and a tributary station which perform a time division multiplex communication, wherein the tributary station includes: a switch unit that switches on/off a power supplied from a battery; a power supply control unit that controls the switch unit; a RAM (Random Access Memory) to which a power is constantly supplied from the battery; a wireless unit that receives a power supplied through the switch unit and performs a wireless communication with the control station; a battery voltage detection unit that detects a battery voltage of the battery; and a control unit that receives the power supplied through the switch unit, wherein the control unit detects the battery voltage while the power is supplied, determines whether or not to notify the control station of information on the battery voltage depending on information read from the RAM, writes information on the battery voltage in the RAM, and outputs a signal of power supply off to the power supply control unit, wherein the control station includes a wireless unit that communicates with the tributary station, and when the information on the battery voltage is not sent for a predetermined time from the tributary station through the wireless unit, the control station performs warning of abnormality of the tributary station.

According to the eleventh aspect of the present invention, since power supplied via the switch unit is cut off in the standby state, it is possible to remove power consumed in circuits to which power is supplied via the switch unit, and, since the control station is notified of information regarding a battery voltage only in a case of being necessary, it is possible to suppress battery consumption. In addition, since the control station manages a communication state with the tributary station, and warns abnormality of the wireless communication system in a case where a non-communication state continues, convenience is improved.

An twelfth aspect of the present invention provides a wireless communication system including a control station and a tributary station which perform a time division multiplex communication, wherein the tributary station includes: a switch unit that switches on/off a power supplied from a battery; a power supply control unit that controls the switch unit; a first clock unit to which a power is constantly supplied from the battery; a timer unit that operates based on clocks generated by the first clock unit and notifies the power supply control unit of an expiration of counting when a count reaches a predetermined count value; a first RAM to which a power is constantly supplied from the battery; a battery voltage detection unit that detects a battery voltage of the battery; a second clock unit that receives a power supplied through the switch unit; a wireless unit that receives the power supplied through the switch unit and performs a wireless communication with the control station; a second RAM to which the power is supplied through the switch unit; a control unit that receives the power supplied through the switch unit and operates with clocks generated by the second clock unit, wherein the control unit is adapted to store information on the battery voltage obtained by the battery voltage detection unit in the second RAM, and before the control unit is shifted to a standby state, the control unit reads and writes the information on the battery voltage from the second RAM into the first RAM, when the control unit is supplied with the power through the switch unit, the control unit determines whether to transmits information on the battery voltage based on information the battery voltage currently obtained by the battery voltage detection unit and the information on the battery voltage read from the first RAM, and when the control unit determines to be necessary, the control unit transmits the information on the battery voltage through the wireless unit to the control station, and then outputs a signal of power supply off to the power supply control unit, wherein the control station includes a wireless unit that communicates with the tributary station, and when the information on the battery voltage is not transmitted for a predetermined time from the tributary station through the wireless unit, the control station performs warning of abnormality of the tributary station.

According to the twelfth aspect of the present invention, since a clock for measuring an interval where a notification of battery information is sent is separated from a clock necessary for wireless communication or an operation of the control unit during the wireless communication, it is possible to use a low frequency clock as the clock for measuring an interval where a notification of battery information is sent and to thereby reduce power consumed in a circuit part which measures the interval where a notification of battery information is sent.

First Embodiment

A wireless communication apparatus according to a first embodiment of the present invention will be described based on the drawings with reference to a wireless phone and a wireless sensor for notifying of door opening/closing as an example.

Figure 1:
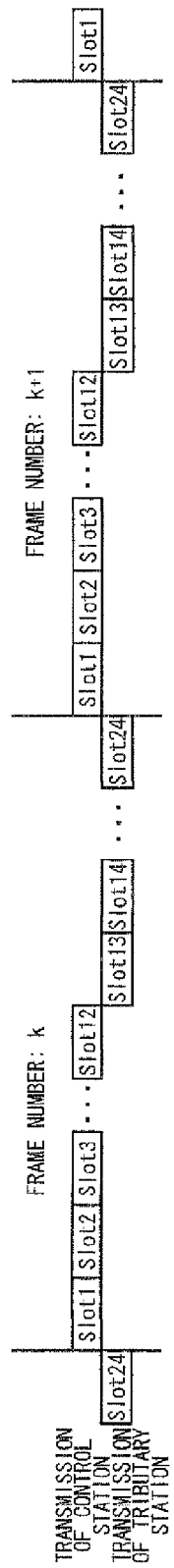
FIG. 1 is a diagram illustrating frame and slot configurations in a DECT standard.

In FIG. 2, a wireless communication apparatus 10 includes one master unit 20 connected to a telephone network 50, three phone slave units 30 (A to C), and sensor slave units 40 (A to C) having functions as sensors for detecting opening and closing of a window. The master unit 20, the phone slave unit 30, and the sensor slave unit 40 communicate with one another in a DECT standard. As shown in FIG. 1, the DECT standard performs communication in a TDMA/TDD method that is configured to include 24 slots (12 slots for uplink and 12 slots for downlink) in one frame having a period of 10 ms. Further, a control channel slot of at least one slot is allocated in one frame. This control channel and call channels are also transmitted and received in the frame period of 10 ms. Further, respective frequencies/slot positions are optional, and as for the frequencies, all five frequencies are used.

Figure 3:
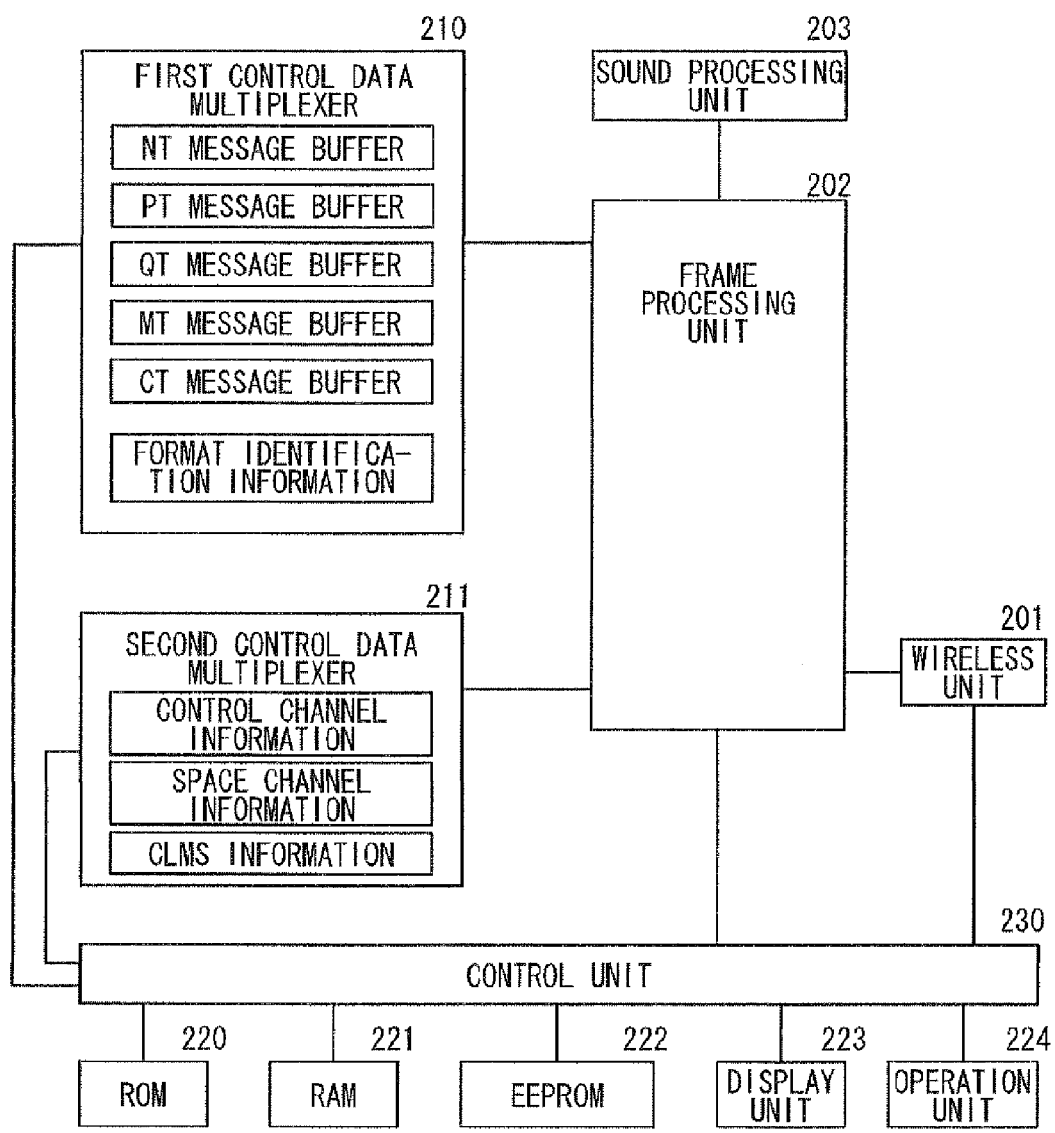
FIG. 3 is a block diagram illustrating the configuration of a master unit illustrated in FIG. 2.

Next, the master unit 20 will be described on the basis of FIG. 3. The master unit 20 includes a wireless unit 201 performing DECT type wireless communication, a frame processing unit 202 transmitting transmission data such as control data or sound data to match the timing for TDMA communication and extracting the data from the reception data to match the timing for the TDMA communication, and a sound processing unit 203 converting the received sound data into an analog sound signal and converting the analog sound signal into digital sound data for transmission.

The master unit 20 further includes a first control data multiplexer 210 managing the transmission order of the control data that is transmitted in an initial control data region of a control signal, and a second control data multiplexer 211 managing the transmission order of the control data that is transmitted in the following control data region.

The master unit 20 further includes a ROM 220 into which programs for controlling the master unit 20 are stored, and a RAM 221 for executing the programs. Further, the master unit 20 includes an EEPROM 222 in which the contents do not disappear even in the power off state and which can rewrite the contents in a specified method, a display unit 223 displaying the operating state or the like, an operation unit 224 performing an input to instruct the operating to the master unit 20, and a control unit 230 controlling the whole master unit 20.

Figure 4:
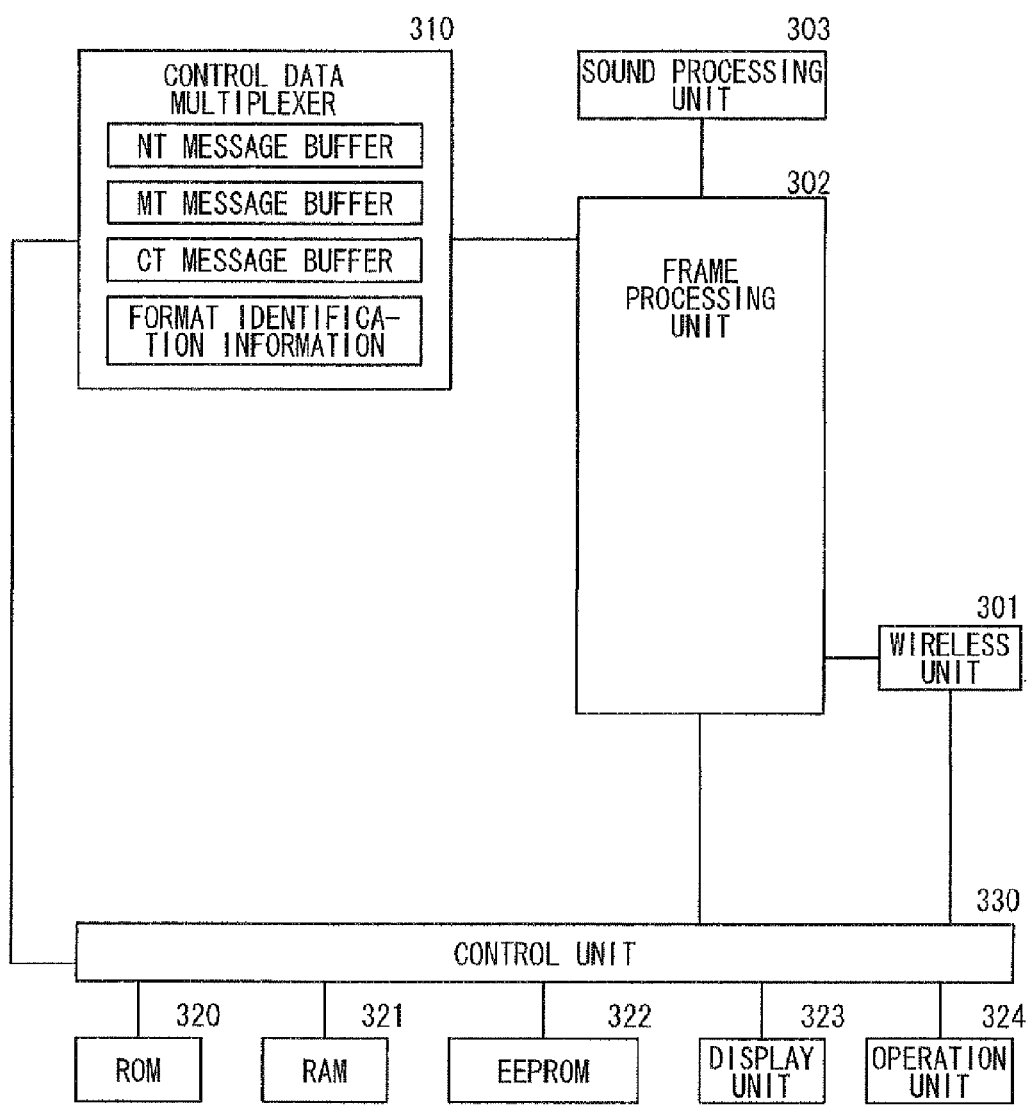
FIG. 4 is a block diagram illustrating the configuration of a phone slave unit illustrated in FIG. 2.

Next, the phone slave unit 30 will be described on the basis of FIG. 4. The phone slave unit 30 includes a wireless unit 301 performing DECT type wireless communication, a frame processing unit 302 transmitting transmission data such as control data or sound data to match the timing for TDMA communication and extracting the data from the reception data to match the timing for the TDMA communication, and a sound processing unit 303 converting the received sound data into an analog sound signal and converting the analog sound signal into digital sound data for transmission.

The phone slave unit 30 further includes a control data multiplexer 310 managing the transmission order of the control data that is transmitted in an initial control data region of the control signal, a ROM 320 into which programs for control are stored, and a RAM 321 for executing the programs. Further, the phone slave unit 30 includes an EEPROM 322 in which the contents do not disappear even in the power off state and the contents can be rewritten in a specified method, a display unit 323 displaying the operating state or the like, an operation unit 324 performing an input to instruct the operating, and a control unit 330 controlling the whole phone slave unit 30. Further, although the phone slave unit 30 is driven by a chargeable battery, the description of the battery or a function block to supply the power from the battery will not be repeated.

Figure 5:
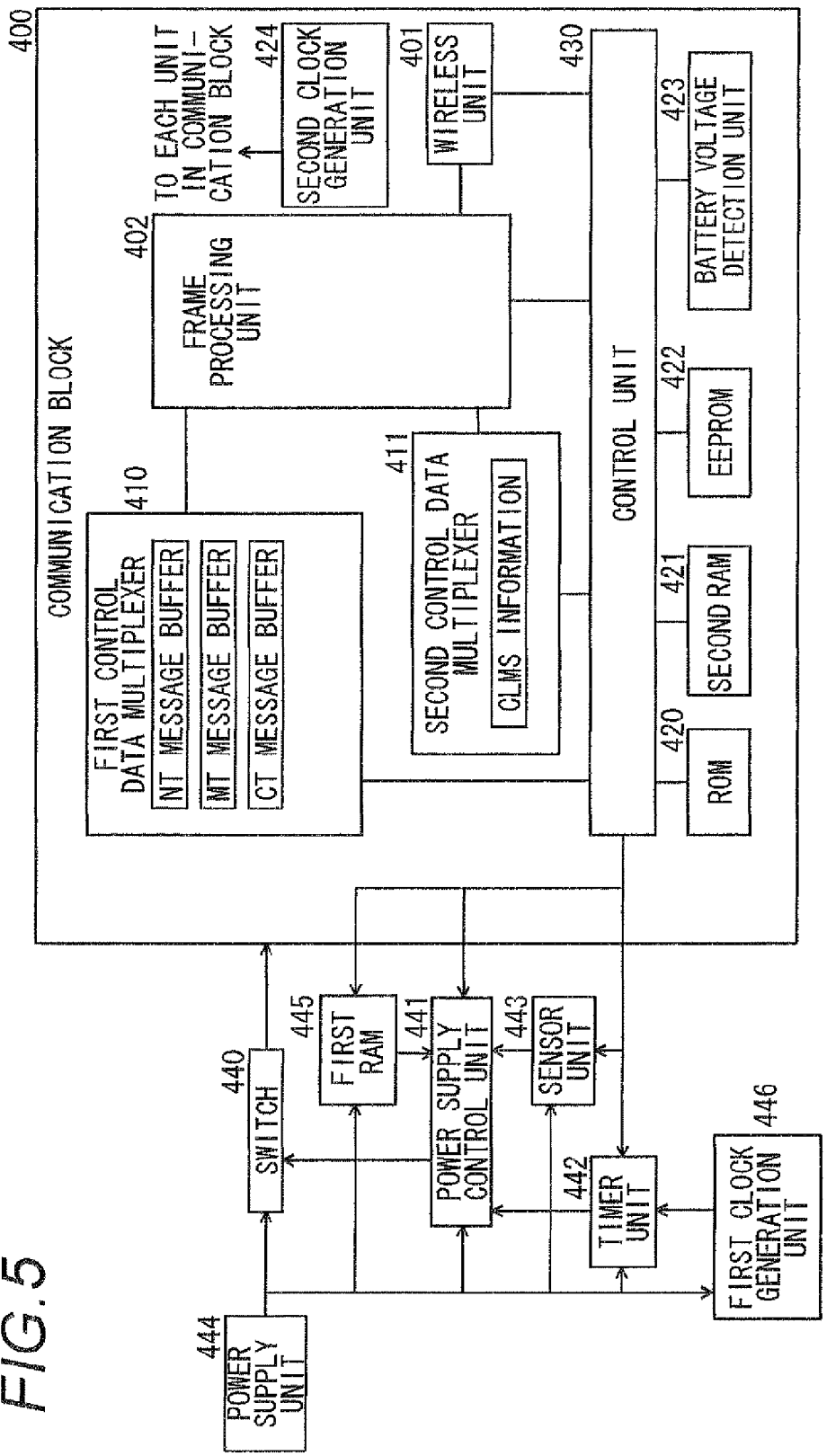
FIG. 5 is a block diagram illustrating the configuration of a sensor slave unit illustrated in FIG. 2.

Next, the sensor slave unit 40 that senses opening and closing of a window and transmits a signal to the master unit 20 will be described on the basis of FIG. 5. The sensor slave unit 40 includes a wireless unit 401 performing the DECT type wireless communication. The sensor slave unit 40 further includes a frame processing unit 402 transmitting transmission data such as control data or sensor detection information to the master unit 20 to match the timing for the TDMA communication and extracting the data from the reception data received from the master unit 20 to match the timing for the TDMA communication.

The sensor slave unit 40 further includes a first control data multiplexer 410 managing the transmission order of the control data that is transmitted to the initial control data region of the control signal, and a second control data multiplexer 411 managing the transmission order of the control data that is transmitted to the following control data region.

Further, the sensor slave unit 40 includes a ROM 420 into which programs for control are stored, a second RAM 421 for executing the programs, an EEPROM 422 in which the contents do not disappear even in the power off state and the contents can be rewritten in a specified method, and a battery voltage detection unit 423 detecting a voltage of a battery which is a power supply. Further, the sensor slave unit 40 includes a second clock generation unit 424 which generates clocks that are necessary for wireless communication by the wireless unit 401 and clocks that are necessary for the operation of the sensor slave unit 40 in the start state thereof. In addition, the sensor slave unit 40 includes a control unit 430 which operates by the clocks generated by the second clock generation unit 424 and controls the whole sensor slave unit 40.

Further, the sensor slave unit 40 includes a switch 440 turning on/off the power supply to a communication block 400 and a power supply control unit 441 generating a power supply control switching signal. Further, the sensor slave unit 40 includes a timer unit 442 measuring timing of power-on. This timer unit 442 generates a power-on signal when a predetermined time elapses. Further, the timer unit 442 measures the timing of a notification retry when notifying the master unit of sensor state information or the time of power-on when regularly notifying the master unit of the measurement value of battery voltage or the like. Further, the sensor slave unit 40 includes a sensor unit 443 detecting the opening and closing of the window and generating a power-on signal, a power supply unit 444 supplying the power to each unit of the sensor slave unit 40 by the power of the battery, and a first RAM 445 that is constantly operable by the battery. Further, the sensor slave unit 40 includes a first clock generation unit 446 generating a clock for driving the timer unit 442.

Since the sensor state information has high emergency, if there is no response from the master unit 20 after the sensor state is transmitted thereto and the normal reception in the master unit 20 is unable to be confirmed, the notification retry is performed multiple times at the frequency of once in several seconds afterwards. In contrast, since information on the battery voltage has lower emergency than the notification of the sensor state, continuous reception is not performed even if normal reception of the master unit 20 is unable to be confirmed. However, the information on the battery voltage is transferred to the master unit 20 while communication with the master unit 20 is performed regularly (at the frequency of once in several minutes) every predetermined time.

In all of the notification retry of the sensor state information and regular communication for transferring the information on the battery voltage, power supply to the communication block 400 is cut off between communication and communication, and at this time, the timer unit 442 counts the clock generated by the first clock generation unit 446. When the timer unit 442 reaches a predetermined count value, it notifies the power supply control unit 441 of the count expiration, and the power supply control unit 441 turns on the power supply to the communication block 400, so that the sensor slave unit 40 starts communication with the master unit 20.

Further, by performing setting so that the timer unit 442 performs counting in slow pace between communication and communication through reduction of the clock frequency of the first clock generation unit 446, it becomes possible to reduce the power consumption. In contrast, it is necessary to set the clock frequency of the second clock generation unit 424 to an appropriately high level in order to perform highly precise count about the communication.

A block that includes the wireless unit 401, the frame processing unit 402, the first control data multiplex unit 410, the second control data multiplex unit 411, the ROM 420, the second RAM 421, the EEPROM 422, the battery voltage detection unit 423, the second clock generation unit 424, and the control unit 430 of the sensor slave unit 40 may be called the communication block 400. The power is supplied to the respective units of the communication block 400 through the switch 440, and if the switch 440 is turned off, the power supply is cut off.

Next, the operation of the wireless communication apparatus 10 according to a first embodiment will be described. In a state where the wireless communication apparatus 10 is in an idle state, the master unit 20 transmits a control signal using one of transmission slots of the control station from Slot: 1 to Slot: 12 of one frame (time width: 10 msec) illustrated in FIG. 1 as a control channel. That is, the control signal is transmitted once for each frame, in the cycle of 10 msec. The control signal includes a message which is transmitted to each phone slave unit from the master unit, such as a calling message. In a case of the idle state, the phone slave unit 30 performs a reception operation with a transmission slot, and receives a message which is sent to the phone slave unit 30 from the master unit 20 by the control signal. In addition, the sensor slave unit 40 does not receive the control signal for each frame since power supply to the communication block 400 is turned off in the idle state. However, the sensor unit 443 is operated even in the idle state, and, generates a power-on signal if a window state change is detected.

FIG. 6 illustrates the format of the control signal that is transmitted from the master unit 20 in the case where only the phone slave unit 30 is registered in the master unit 20. Further, FIG. 7 illustrates the format of the control signal that is transmitted from the master unit 20 in the case where the sensor slave unit 40 is registered in the master unit 20.

In FIGS. 6 and 7, the synchronization signal of the head part includes data to take the synchronization of the bit timing and data to take the synchronization of the bit position in the slot. Control data 1 is control data that is output to the first control data multiplexer 210, and error detection code 1 is a code to detect reception error of the control data 1. If the slave unit that is registered in the master unit 20 is only the phone slave unit 30 and the sensor slave unit 40 is not registered, it is assumed that the amount of data that is once transmitted by the control signal is the amount of data that can be transmitted as one control data 1, and if the control signal once transmitted is insufficient, the transmission is performed using the control signal multiple times.

In FIG. 7, control data 2, control data 3, control data 4, and control data 5 are control data output to the second control data multiplexer 211, and error detection code 2, error detection code 3, error detection code 4, and error detection code 5 are codes to detect reception errors of the preceding control data 2, control data 3, control data 4, and control data 5. In the case where the sensor slave unit 40 is registered in the master unit 20 as described above, in addition to the control data 1 and the error detection code 1 illustrated in FIG. 6, all the information necessary as possible for the control signal once transmitted can be transmitted by increasing the amount of data transmitted by the control signal once transmitted using a format in which the control data 2, control data 3, control data 4, control data 5, and the respective error detection codes.

Further, the region of the control data 1 in FIGS. 6 and 7 includes the region in which format identification information of the data that is transmitted to the corresponding Slot is transmitted and received. The format identification information that is transmitted to the control data 1 is information for identifying, for example, whether or not the data of the corresponding slot is composed of any format illustrated in FIG. 6, 7, or 9, whether or not the information in the control data 2, control data 3, control data 4, and control data 5 indicates the synchronization for the TDMA communication or the operating state of the master unit in the case where the transmission is performed with the format of FIG. 7, or whether or not the corresponding information is a message for message communication between applications.

FIG. 8 is a diagram illustrating the kinds and transmission order of control signals that are transmitted with the format illustrated in FIG. 6 by the master unit 20 in the case where only the phone slave unit 30 is registered in the master unit 20. Here, an example of multi-frame control that transmits various kinds of control signals to assume 16 frames as one period. As shown in FIG. 8, the master unit 20 transmits a PT message to notify of information related to paging, such as call information and phone number information of a called party for calling party number notification, in a frame having a frame number that is 16 integral multiples, a QT message to notify of system information, such as a frame number, a master unit function, a communication frequency, a standby frequency, and the like, in a frame having a frame number that is (16 integral multiples+8) and to be used as a reference frame for multi-frame control, and an NT message to notify of a mater ID that is the master unit identification information in a frame having other frame numbers.

Next, the operation to transmit the control signal in the case where only the phone slave unit 30 is registered in the master unit 20 will be described with reference to FIGS. 8 and 3. The control unit 230 of the master unit 20 stores information on a slave unit that is registered in the EEPROM 222. That is, if the registration of the slave unit is performed, the master unit 20 stores a slave unit ID for identifying the slave unit and slave unit classification identification information for identifying whether the slave unit is a phone slave unit 30 or a sensor slave unit 40. If the registered slave unit is the phone slave unit 30 only, the control unit 230 controls the frame processing unit 202 and the wireless unit 201 to transmit the control signal illustrated in FIG. 8. That is, the control unit 230 selects one of Slot: 1 to Slot: 12 for transmission to be used for transmission of the control signal, selects one frequency from predetermined frequencies, and controls the transmission unit of the wireless unit 201 to transmit the control signal with the format illustrated in FIG. 6 with the selected slot and frequency (hereinafter, the slot selected by the control unit 230 of the master unit 20 for transmission of the control signal is called a "control slot").

The control unit 230 controls to write the master unit ID thereof in an NT message buffer of the first control data multiplexer 210, to write call information depending on event occurrence such as call reception and phone number information of a called party for calling party number notification in a PT message buffer, and to write in order a frame number of each of 16 frames, a master unit function, a slot number, and a control signal to notify of system information, such as a usage frequency and a standby frequency, in a QT message buffer.

The first control data multiplexer 210 outputs the data of the PT message buffer to the frame processing unit 202 if the frame number becomes 16 integral multiples, and outputs the data of the QT message buffer to the frame processing unit 202 if the frame number becomes (16 integral multiples+8). In the case of other frame numbers, that is, if the frame number is neither 16 integral multiples nor (16 integral multiples+8), the first control data multiplexer 210 outputs the data of the NT message buffer to the frame processing unit 202.

The frame processing unit 202 generates a transmission data stream by filling the region of the control data 1 with the data being transmitted to the region of the control data 1, depending on the data output from the first control data multiplexer 210 and the format identification information indicating that the data is configured in the format of FIG. 6, generates error detection code 1 depending on the transmitted data in the region of the control data 1, and outputs the data stream to the wireless unit 201 in the order of the synchronization signal, the control data 1, and the error detection code 1 with the format of FIG. 6 to match the timing of the control slot.

Next, the reception operation of the master unit 20 and the data format at the time of sound communication between the master unit 20 and the phone slave unit 30 will be described. FIG. 9 illustrates a data format in the case where the master unit 20 and the phone slave unit 30 perform a voice call with each other. In FIG. 9, in the region of control data 1, a region to transmit the format identification information indicating that the data is configured in the format of FIG. 9 and a region to transmit a control message for voice call start are installed. This control message region is used for the communication of the MT message to start a communication channel, the NT message to notify of the master ID, and the CT message to notify of a negotiation message of a higher layer such as a network layer or the like. The error detection code 1 is a region of an error detection code to detect the reception error of the control data 1.

Sound data in the format illustrated in FIG. 9 is, for example, a region of sound data that is obtained by encoding the analog sound signal in a G.726 method, and the error detection code 6 is a region of an error detection code to detect the reception error of the region of the sound data.

The master unit 20 operates to receive a wireless signal of a call start demand, which is always transmitted with the format of FIG. 9 from the phone slave unit 30, through 11 Slots except for a slot that is apart for 12 slots from the control slot among 12 slots which are from Slot: 13 to Slot: 24 (hereinafter, a slot in which the call start demand is in a standby state is called a "standby slot"). For example, if the slot that transmits the control signal is Slot: 1, the wireless signal that is transmitted from the phone slave unit 30 is received through 11 slots that are from Slot: 14 to Slot: 24, except for Slot: 13 that is apart for 12 slots from Slot: 1.

Since the reception is performed through the standby slot, the control unit 230 of the master unit 20 controls the reception frequency of the reception unit of the wireless unit 201. The reception frequency in the standby slot is sequentially changed from the small frequency number of the use frequency of which there is notification from the system information of the QT message of the control signal for each frame. Further, the standby frequency of which there is notification from the system information of the QT message is information to notify of the reception frequency in the standby slot of the frame that transmits the QT message.

The reception data received in the wireless unit 201 is output to the frame processing unit 202. The frame processing unit 202 operates to extract the data stream of the region of the control data 1 and the error detection code 1 illustrated in FIG. 6 from the reception data of each slot, to determine whether or not the data of the region of the control data 1 is correct data using the data received in the region of the error detection code 1, and to notify the control unit 230 of the data of the region of the control data 1 if the data is correct data.

Next, the operation of the phone slave unit 30 until the phone slave unit 30 shifts to an idle state after the power-on will be described. If the power is supplied to the phone slave unit 30, the phone slave unit 30 operates to search for the control signal that is transmitted from the master unit 20 which is the master unit of the phone slave unit 30 (hereinafter described as a "master search operation"). Then, if the control signal that is transmitted from the master unit 20 is detected, the phone slave unit 30 collects various kinds of information transmitted in the QT message of the control signal, and performs an operation to take frame and slot synchronization with the master unit based on the information to be in a communicable state (hereinafter described as "frame and slot synchronization operation").

Figure 10:
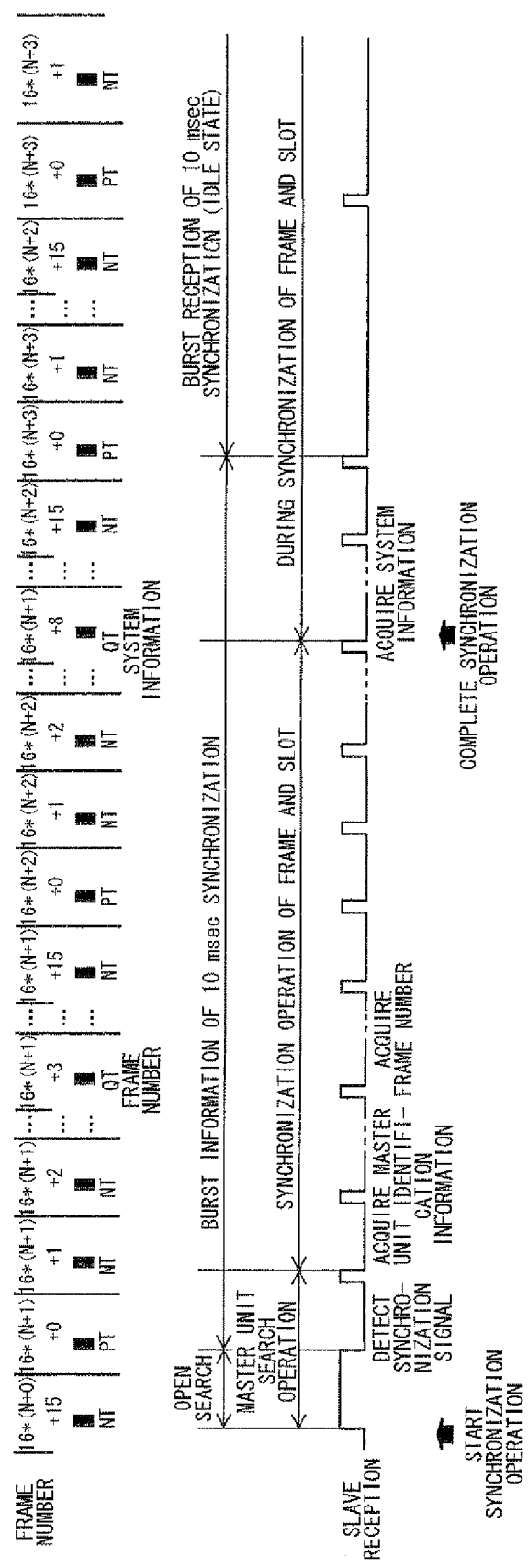
FIG. 10 is a diagram illustrating the operation in which a phone slave unit illustrated in FIG. 2 establishes synchronization of frames and slots together with a master unit.

FIG. 10 illustrates the operation in which the phone slave unit 30 establishes frame and slot synchronization with the master unit 20. In FIG. 10, if the operation for synchronization starts, a consecutive reception for searching for the master unit, that is, an open search starts. If the synchronization signal illustrated in FIG. 6 is detected from the reception data, the phone slave unit 30 detects the control signal that is transmitted from the master unit itself by extracting the data stream of the region of the control data 1 and the error detection code 1 from the following reception data and determining whether or not the NT message to notify of the master unit ID of the master unit itself exists. FIG. 10 illustrates an example in the case where the message that is initially received after the open search start is the PT message. In this case, the phone slave unit 30 stops and changes the consecutive reception to the reception of the cycle of 10 msec, and receives the following control signal after 10 msec. During the reception after 10 msec, the phone slave unit 30 receives the NT message, and if it is recognized that the signal being received is the control signal that is transmitted from the master unit itself, the phone slave unit 30 changes the search operation from the master unit search operation to the frame and slot synchronization operation.

In the frame and slot synchronization operation, the phone slave unit 30 collects various kinds of information transmitted by a plurality of QT messages through continuous reception of the cycle of 10 msec, and if necessary information gathers, the phone slave unit 30 is in a frame and slot synchronization state where communication with the master unit becomes possible. Thereafter, the phone slave unit 30 becomes an idle state in which the phone slave unit 30 performs reception to match the timing of the PT message that is transmitted in the cycle of 160 msec.

Next, the operation of the respective units of the phone slave unit 30 until the phone slave unit 30 shifts to the idle state after the power-on will be described with reference to FIG. 4. If the power is turned on, the control unit 330 starts its operation. The control unit 330 controls the wireless unit 301 to perform the consecutive reception operation with a predetermined frequency. The reception data received in the wireless unit 301 is output to the frame processing unit 302. The frame processing unit 302 searches for the synchronization signal illustrated in FIG. 6 from the reception data, extracts the data stream of the region of the following control data 1 and error detection code 1, and determines whether or not the data of the region of the control data 1 is correct data using the data received in the region of the error detection code 1. If the data is correct data, the frame processing unit 302 operates to notify the control unit 330 of the data of the region of the control data 1.

If there is notification of the control data, the control unit 330 of the phone slave unit 30 controls the wireless unit 301 to stop and change the consecutive reception to the reception of the cycle of 10 msec. Then, the control unit 330 determines whether or not the search operation is changed from the slave unit search operation to the frame and slot synchronization operation by determining whether or not the received signal is the data transmitted from the master unit itself through comparison of the reception data with the master unit ID of the phone slave unit 30 stored in the EEPROM 322. Further, if the received data is other than the NT message, the control unit 330 determines whether or not the signal received on the basis of the data received by the reception of the cycle of 10 msec thereafter is the data transmitted from the master unit itself.

If the received data is the data transmitted from the master unit itself, the control unit 330 continues the reception of the cycle of 10 msec to perform the frame and slot synchronization operation. If the received data is not the data transmitted from the master unit itself, the control unit 330 restarts the open search to start the search for the next master unit. Further, if the control signal of the master unit itself is unable to be received although the master unit search operation is performed for a predetermined time or for a predetermined number of times with one frequency during the open search, the control unit 330 controls the wireless unit 301 to perform the consecutive reception operation by changing the reception frequency.

The control unit 330 of the phone slave unit 30 establishes the synchronization of the frame number and the slot number with the master unit 20 through reception of the frame number and the system information of the QT message after performing the frame and slot synchronization operation, and recognizes the setting order of the reception frequency of the standby slot of the master unit. If there is notification of all the necessary information through the control signal and the necessary information is received, the control unit 330 starts control to shift to the idle state in which the reception is performed in the cycle of 160 msec. That is, the control unit 330 shifts the control to start the reception of the wireless unit 301 to match the timing of the PT message that is transmitted with the frame number of 16 multiples.

Next, the call operation of the phone slave unit 30 to the master unit 20 will be described as an example of the operation when an event of an outside call reception occurs. If the event of the outside call reception occurs, the control unit 230 of the master unit 20 writes the PT message that notifies of the outside call reception (hereinafter described as an "outside call reception message") in the PT message buffer of the first control data multiplexer 210. The outside call reception message is output to the wireless unit 201 at the timing when the frame number is of 16 multiples, and is transmitted as the control signal, being put in the region of the control data 1 illustrated in FIG. 6.

On the other hand, the wireless unit 301 of the phone slave unit 30 performs the reception at the timing when the frame number is of 16 multiples in the idle state, and the outside call reception message that is transmitted to be put on the control signal from the master unit 20 is received in the wireless unit 301 and is output to the frame processing unit

202. The frame processing unit 202 extracts the outside call reception message from the region of the control data 1 illustrated in FIG. 6, and outputs the extracted outside call reception message to the control unit 330.

If the outside call reception message is received, the control unit 330 of the phone slave unit 30 performs control to notify a user of the outside call reception by making a ringer sound rumble in the display unit 323. Then, if a user's operation to respond to the reception is performed in the operation unit 324, the control unit 330 selects one slot of the standby slots that is used to transmit the message from the slave unit through the following communication, and selects the "frequency for communication" to be used in the following communication. Hereinafter, the slot selected to transmit the message from the slave unit is described as a "slave transmission slot for communication" (or a master unit reception slot for communication). Further, the control unit 330 selects the slot that is apart for 12 slots from the selected slave unit transmission slot for communication as the slot that is used for reception in the slave unit through the following communication. Hereinafter, the slot selected for reception in the slave unit is described as the "slave reception slot for communication" (or a master unit transmission slot for communication).

In order to confirm whether or not the slave unit reception slot for communication and the slave unit transmission slot for communication can be used without interference, the control unit 330 sets the wireless unit 301 to receive the frequency for communication through the slots, and performs carrier sense of the slave unit transmission slot for communication and the slave unit reception slot for communication.

If the reception level of interfering waves of the slot is equal to or lower than a threshold value stored in the EEPROM 322, the control unit 330 of the phone slave unit 30 determines that the slot is available, and shifts to an operation to transmit a message for starting the communication channel (hereinafter described as a "wireless link establishment demand message"). That is, the control unit 330 writes the wireless link establishment demand message in the MT message buffer of the control data multiplexer 310, and controls the wireless unit 301 to perform the transmission with the above-described frequency for communication using the slot so that the master unit 20 matches the standby slot with the frequency that coincides with the frequency for this time communication. At this time, the communication between the phone slave unit 30 and the master unit 20 is performed using the format of FIG. 9 as described above. The frame processing unit 302 puts the MT message that includes the wireless link establishment demand message in the region of the control data 1 with the format illustrated in FIG. 9, puts the sound data output from the sound processing unit 303 in the region. of sound data, calculates and puts respective error detection marks in the region of the error detection code 1 to output to the wireless unit 301. The wireless unit 301 operates to transmit the wireless signal that includes the above-described data.

The wireless signal including the wireless link establishment demand message that is transmitted from the phone slave unit 30 is received in the wireless unit 201 of the master unit 20 and is output to the frame processing unit 202. The frame processing unit 202 extracts the wireless link establishment demand message and notifies the control unit 230 of the extracted wireless link establishment demand message.

If the wireless link establishment demand message is received, the control unit 230 of the master unit 20 starts to control the sound communication with the slave unit using the frequency (frequency for communication) for receiving the wireless link establishment demand message by using a slot (master reception slot for communication) that receives the wireless link establishment demand message from the phone slave unit 30 and two slots of going up/down that is completed from the slot (master transmission slot for communication) that is apart for 12 slots from the corresponding slot.

In controlling the sound communication, the control unit 230 of the master unit 20 transmits the frame after receiving the wireless link establishment demand message to the master unit transmission slot for communication using the frequency for communication, and writes the wireless link establishment response message in the MT message buffer that corresponds to the master unit transmission slot for communication of the first control data multiplexer 210 at that time by controlling the wireless unit 201 to perform reception through the master unit reception slot for communication. This wireless link establishment response message is output to the frame processing unit 202 so as to be transmitted at the timing of the master unit transmission slot for communication, and the frame processing unit 202 operates to put the MT message of the wireless link establishment response message in the region of the control data 1 to transmit the MT message, to put the sound data output from the sound processing unit 203 in the region of the sound data, to calculate and put respective error detection marks in the region of the error detection code to transmit the error detection marks.

As described above, an interactive wireless link is established in the slot that is apart for 12 slots between the phone slave unit 30 and the master unit 20. The phone slave unit 30 writes the start demand message of a data link layer of the control data multiplexer 310 in the CT message buffer of the control data multiplexer 310, and the master unit 20 writes the response message of the data link layer of the first control data multiplexer 210 in the CT message buffer of the control data multiplexer 310, and establishes the data link where retransmission control is possible by transmitting and receiving the CT message in the same manner as the above-described transmission and reception of the MT message. The CT message is used for communication to notify a negotiation message of a higher layer such as a network layer, and by using the CT message, the retransmission control is performed if the transmission is not confirmed.

The phone slave unit 30 writes the higher layer message such as the start demand message (SETUP) of a network layer of the control data multiplexer 310 in the CT message buffer of the control data multiplexer 310, and the master unit 20 writes the higher layer message such as the response message (CONNECT) of the network layer of the first control data multiplexer 210 in the CT message buffer of the control data multiplexer 310, and completes a call connection by transmitting and receiving the CT message in the same manner as the transmission and reception of the MT message and performing negotiation of the higher layer through the data link layer in which the transmission is secured to shift to a communicable state.

Next, the operation of the master unit 20 in the case where the sensor slave unit 40 is registered in the master unit 20 will be described. FIG. 11 is a diagram illustrating the kinds and transmission order of control signals that is transmitted by the master unit 20 in the case where the sensor slave unit 40 is registered in the master unit 20. In this case, the format illustrated in FIG. 7 is used in the control signal that is transmitted by the master unit 20, and information, which may be put while the frame is updated, can be replaced. Hereinafter, the replacement of information in the frame will be described in detail.

In the case where the sensor slave unit 40 is registered in the master unit 20, the master unit 20, in addition to the transmission data of the control signal in the case where only the phone slave unit 30 is registered in the master unit 20, transmits four pairs of control data and error detection codes, that is, control data 2 and error detection code 2, control data 3 and error detection code 3, control data 4 and error detection code 4, and control data 5 and error detection code 5.

As illustrated in FIG. 11, in the region of control data 1, the master unit 20 transmits a PT message to notify of information related to paging, such as call information and phone number information of a called party for calling party number notification, in a frame having a frame number that is of 16 integral multiples. Further, in the region of control data 1, the master unit 20 transmits a QT message to notify of system information, such as a frame number, a master unit function, a communication frequency, a standby frequency, and the like, in a frame having a frame number that is of (16 integral multiples+8) and to be used as a reference frame for multi-frame control. Further, in the region of control data 1, the master unit 20 transmits an NT message to notify of a master unit ID that is the master unit identification information in a frame having other frame numbers.

Further, in the whole frame, the master unit 20 transmits format identification information using the region of the control data 1. In the case where even one sensor slave unit 40 is registered, information indicating that control information such as information to notify of synchronization for TDMA communication or operating state of the master unit using the data regions is transmitted to all registered slave units, using a format of the message of the control signal, in which, in addition to control data 1, control data 2, control data 3, control data 4, control data 5, and their error detection codes are connected according to the format identification information, as shown in FIG. 7.

Further, in the regions of control data 2, control data 3, control data 4, and control data 5, the master unit 20 alternately transmits control channel information and space channel information in duplicate twice in one frame so that the same data do not continue in the same frame. Further, in the region of the same control data, the master unit 20 transmits the information while changing the order of the information whenever the frame number is updated. That is, in the frame having an even frame number, the transmission is performed in the order of the control channel information, the space channel information, the control channel information, and the space channel information, and in the frame having an odd frame number, the transmission is performed in the order of the space channel information, the control channel information, the space channel, information, and the control channel information. Through this, if only one control data region can normally be received even if agitation occurs, both data of the control channel information and the space channel information can be acquired if it is possible to receive the data of the control data region as multiple frames.

Next, the operation of each unit in which the master unit 20 transmits the control signal in the case where the sensor slave unit 40 is registered in the master unit 20 will be described with reference to FIG. 3. The control unit 230 of the master unit 20 stores information of the registered slave unit in the EEPROM 222. That is, in the case of registering the slave unit in the master unit 20, the slave unit ID for identifying the slave unit is stored in the EEPROM 222 to match the slave unit classification identification information for identifying whether the slave unit is the phone slave unit 30 or the sensor slave unit 40.

If the sensor slave unit 40 is included in the registered slave units, the control unit 230 of the master unit 20 controls the frame processing unit 202 and the wireless unit 201 to transmit the control signal illustrated in FIG. 11. That is, the control unit 230 selects one of Slot: 1 to Slot: 12, and selects one frequency from a plurality of predetermined frequencies. The control unit 230 controls the transmission unit of the wireless unit 201 to be able to transmit the control signal having the format illustrated in FIG. 7 with the selected slot and the selected frequency.

The control unit 230 controls to write the master unit ID thereof in the NT message buffer of the first control data multiplexer 210, to write call information depending on the event occurrence such as the call reception and phone number information of the called party for the calling party number notification in the PT message buffer, and to sequentially write a control signal to notify system information, such as a frame number of each of 16 frames, a master unit function, a slot number, a use frequency, a standby frequency, and the like, in the QT message buffer. Through this, the first control data multiplexer 210 of the master unit 20 outputs the data of the PT message buffer to the frame processing unit 202 if the frame number becomes of 16 integral multiples, and outputs the data of the QT message buffer to the frame processing unit 202 if the frame number becomes of (16 integral multiples+8). In the case of other frame numbers, that is, if the frame number is neither 16 integral multiples nor (16 integral multiples+8), the first control data multiplexer 210 outputs the data of the NT message buffer to the frame processing unit 202.

Further, the control unit 230 controls to write the control channel information and the space channel information in the second control data multiplexer 211 depending on the operative situation. In a frame having an even frame number, the second control data multiplexer 211 outputs to the frame processing unit 202 the control channel information to match the transmission timing of the control data 2, the space channel information to match the transmission timing of the control data 3, the control channel information to match the transmission timing of the control data 4, and the space channel information to match the transmission timing of the control data 5, respectively. Further, in a frame having an odd frame number, the second control data multiplexer 211 outputs to the frame processing unit 202 the space channel information to match the transmission timing of the control data 2, the control channel information to match the transmission timing of the control data 3, the space channel information to match the transmission timing of the control data 4, and the control channel information to match the transmission timing of the control data 5, respectively.

The frame processing unit 202 generates format identification information indicating that the regions of the control data 2, control data 3, control data 4, and control data 5 are configured in the format illustrated in FIG. 7, in which the control information, such as information to notify of the synchronization for the TDMA communication or the operating state of the master unit, is configured, and a data stream that is transmitted to the region of the control data 1 as the data output from the first control data multiplexer 210. Further, the frame processing unit 202 generates error detection code 1 depending on the data transmitted from the region of the control data 1, error detection code 2 depending on the data transmitted to the control data 2 which is output to match the transmission timing of the control data 2 output from the second control data multiplexer 221, error detection code 3 depending on the data transmitted to the control data 3 which is output to match the transmission timing of the control data 3 output from the second control data multiplexer 221, error detection code 4 depending on the data transmitted to the control data 4 which is output to match the transmission timing of the control data 4 output from the second control data multiplexer 221, and error detection code 5 depending on the data transmitted to the control data 5 which is output to match the transmission timing of the control data 5 output from the second control data multiplexer 221.

Further, the frame processing unit 202 outputs the data stream to the wireless unit 201 to match the timing of the control slot in the order of the synchronization signal, control data 1 (format identification information and data output from the first control data multiplexer 210), error detection code 1, control data 2 (data output from the second control data multiplexer 211), error detection code 2, control data 3 (data output from the second control data multiplexer 211), error detection code 3, control data 4 (data output from the second control data multiplexer 211), error detection code 4, control data 5 (data output from the second control data multiplexer 211), and error detection code 5. Further, the wireless unit 201 converts the data stream into a wireless signal of a predetermined frequency and transmits the wireless signal as the control signal.

Next, the reception operation of the master unit 20 in the case where the sensor slave unit 40 is registered will be described. First, a message communication method between the sensor slave unit 40 and the master unit 20 will be described. Two message transmission methods are possible between the sensor slave unit 40 and the master unit 20. One is a method to establish an interactive wireless link using data with the format illustrated in FIG. 9 in the same manner as the interactive communication between the phone slave unit 30 and the master unit 20, to perform negotiation of higher layers, such as a data link layer and a network layer, and to perform message communication of an application layer that notifies of the sensor state or the like (hereinafter, this method is called a connection message communication method). In the case of performing message transmission and reception of the application layer using the connection message communication method between the sensor slave unit 40 and the master unit 20, the sensor slave unit 40 does not transmit sound data to the master unit 20, and thus the sound data region of FIG. 9 is ignored. At this time, the message of the application layer is transmitted to and received from the region of control data 1 as one of the CT messages. Further, in the case of performing transmission and reception of the message of the application layer in the connection message communication method, it is also possible to stop the transmission and reception of the sound data region, to transmit and receive only the synchronization signal, the control data 1, and the error detection code 1 using the format of FIG. 6, and to perform transmission and reception of the message of the application layer as one of the CT messages.

The other message transmission method between the sensor slave unit 40 and the master unit 20 is a method to perform the message communication of the application layer that notifies of information on the sensor state and the battery voltage of the sensor slave unit, without negotiation of the higher layer such as the network layer, using the data with the format illustrated in FIG. 7 (hereinafter, this method is called a connectionless message communication method).

The connectionless message communication method concludes the data transmission only by one slot if no error exists. In this case, in the region of the control data 1, the corresponding slot transmits the format identification information indicating that a message for message communication between applications is transmitted using the data with the format illustrated in FIG. 7 and a master unit identification cord by an NT message. Further, the slot dividedly transmits the data stream, such as a slave unit identification cord, a message identifier indicating that this message is a connectionless message, and the main body of a message, to the regions of the data 2, control data 3, control data 4, and control data 5.

Next, a slot through which the master unit 20 receives communication from the sensor slave unit 40 will be described. Since the master unit 20 simultaneously waits for both communication of the connection message communication method and the connectionless message communication method, it performs reception from the sensor slave unit 40 by making all 12 slots that are from Slot: 13 to Slot: 24 in a regular reception state. At this time, the slot that is apart for 12 slots from the control slot performs reception with the same frequency as the transmission frequency of the control signal. Further, other 11 slots perform reception with the reception frequency according to the reception frequency control in the standby slot of which there is notification as the system information of the QT message to wait for the communication from the sensor slave unit 40 and the phone slave unit 30.

Next, referring to FIG. 3, the operation of each block of the master unit 20 in Slot: 13 to slot: 24 will be described. In the slot that is apart for 12 slots from the control slot, the control unit 230 of the master unit 20 performs reception with the same frequency as the transmission frequency of the control signal, and in other slots, the control unit 230 controls the reception unit of the wireless unit 201 to perform reception with the reception frequency according to the reception frequency control in the standby slot of which there is notification as the system information of the QT message. The reception data received in the wireless unit 201 is output to the frame processing unit 202.

The frame processing unit 202 extracts the data stream of the regions of the control data 1 and the error detection code 1 from the reception data of each slot, and determine whether or not the data of the region of the control data 1 is correct data using the received data in the region of the error detection code 1. If the reception signal appears to be configured with the format illustrated in FIG. 7 by the format identification information that is transmitted from the region of the control data 1, the frame processing unit 202 operates to determine whether or not the data of the region of the control data 2, the data of the region of the control data 3, the data of the region of the control data 4, and the data of the region of the control data 5 are correctly received using the data received in the region of the error detection code 2, the data received in the region of the error detection code 3, the data received in the region of the error detection code 4, and the data received in the region of the error detection code 5, respectively, and to notify the control unit 230 of the correctly received data of the control region. The control unit 230 that has received the data of the control data region analyzes the data and starts control depending on the received data.

Next, referring to FIG. 5, the operation of the sensor slave unit 40 will be described. In the sensor slave unit 40, the switch 440 is normally in an off state, and the communication block 400 is in a condition that the power is not supplied thereto. in this state, if a window is changed from a closed state to an open state, or from an open state to a closed state, the sensor unit 443 detects the change and outputs a power-on signal to the power supply control unit 441. If the power-on signal is input, the power supply control unit 441 outputs a switching signal for turning on the switch 440. Through this, the switch 440 is turned on, and the power is supplied to the communication block 400 through the switch 440.

If the power is supplied to the communication block 400, the control unit 430 starts its operation to perform the control according to a program written in the ROM 420. That is, the control unit 430 reads the window state through the sensor unit 443 and notifies the master unit 20 of the read window state with a wireless signal.

Next, an operation in which the sensor slave unit 40 notifies the master unit 20 of a state of the window will be described. First, an operation until the sensor slave unit 40 receives the control signal from the master unit 20 and establishes synchronization will be described. The control unit 430 which reads the state of the window starts the master unit search operation and controls the wireless unit 401 to perform consecutive reception operation with a predetermined frequency. The reception data received by the wireless unit 401 is output to the frame processing unit 402. If the data is the control, signal from the master unit 20, it may include a synchronization signal illustrated in FIG. 7 and control data next to the synchronization signal. The frame processing unit 402 searches for the synchronization signal illustrated in FIG. 7, extracts the data stream of the regions of the following control data 1 and error detection code 1, and determines whether or not the data of the region of the control data 1 is correct data using the data received from the region of the error detection code 1. If the data is the correct data, the frame processing unit 402 operates to notify the control unit 430 of the data of the region of the control data 1.

If there is notification of the control data, the control unit 430 controls to stop the consecutive reception of the wireless unit 401 and to switch to a synchronous reception operation to perform the reception of the signal in the cycle of 10 msec. If the received control data includes an NT message to notify of the master unit ID, the control unit 430 determines whether or not the received signal is the data that is transmitted from the master unit itself by comparing the master unit ID thereof that is stored in the EEPROM 422 with the reception data. Further, if the initially received data is except for the NT message, the control unit 430 then determines whether or not the received signal is the data that is transmitted from the master unit itself based on the data received by the reception operation in the cycle of 10 msec.

If the received data is the data that is transmitted from the master unit itself, the control unit 430 continues the reception in the cycle of 10 msec, and shifts to the frame and slot synchronization operation. Further, if the received data is not the data that is transmitted from the master unit itself, the control unit 430 restarts the open search and starts to search for the next master unit. Further, if the control signal of the master unit itself is unable to be received although the master unit search operation is performed for a predetermined time with one frequency or for a predetermined number of times, the control unit 430 controls the wireless unit 401 to perform the consecutive reception operation by changing the reception frequency.

If the control unit 430 shifts to the frame and slot synchronization operation, the control unit 430 reads the frame number of the QT message and system information which are put in the region of the control data 1, performs establishment of the synchronization with the frame number and the slot number of the master unit 20 based on the information, and performs in parallel establishment of the synchronization with the frame number and the slot number of the master unit 20 based on the control channel information and the space channel information that are received in the regions of the control data 2, control data 3, control data 4, and control data 5. That is, if the reception error does not occur in the data of the slot that has received the master unit ID of the master unit itself in the region of the control data 1, the control unit 430 establishes the synchronization between the control channel information and the space channel information received in the regions of the control data 2 and control data 3 of the corresponding slot and the frame number and the slot number.

If the communication environment is bad and the whole control data of the synchronization signal is unable to be normally received by the slot once, the synchronization may be established by receiving the synchronization signal with a plurality of frames every 10 msec. For example, in the environment in which the control data 1 and the control data 2 are able to be correctly received by the initial synchronization signal, but when the control data 3, control data 4, and control data 5 are unable to be correctly received, the synchronization of the frame number and the slot number are established by receiving the master unit ID of the master unit itself in the region of the control data 1 of the initial control signal and one part of the control channel information or the space channel information in the region of the control data 2 and then by receiving the other part of the control channel information or the space channel information in the region of the control data 2 of the slot received with the following frame. Further, in the environment in which the control data 2, control data 3, control data 4, and control data 5 are unable to be correctly received, the synchronization of the frame number and the slot number is established by collecting the necessary information in the QT message that is transmitted at the frequency once in 16 frames in the region of the control data 1 in the same manner as the phone slave unit 30.

Figure 12:
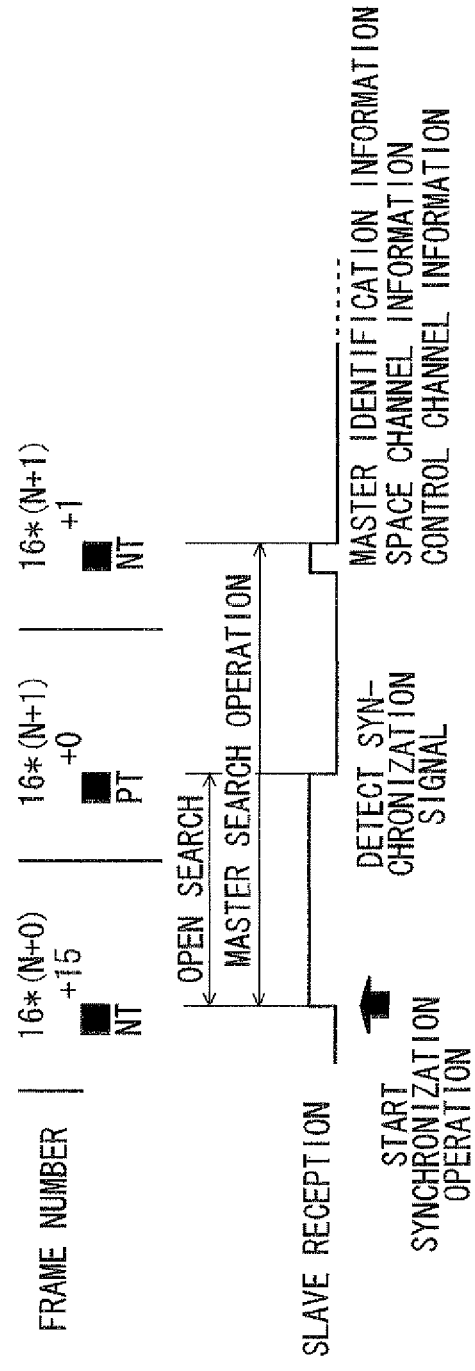
FIG. 12 is a diagram illustrating the operation in which a sensor slave unit illustrated in FIG. 2 establishes synchronization of frames and slots together with a master unit.
Figure 13:
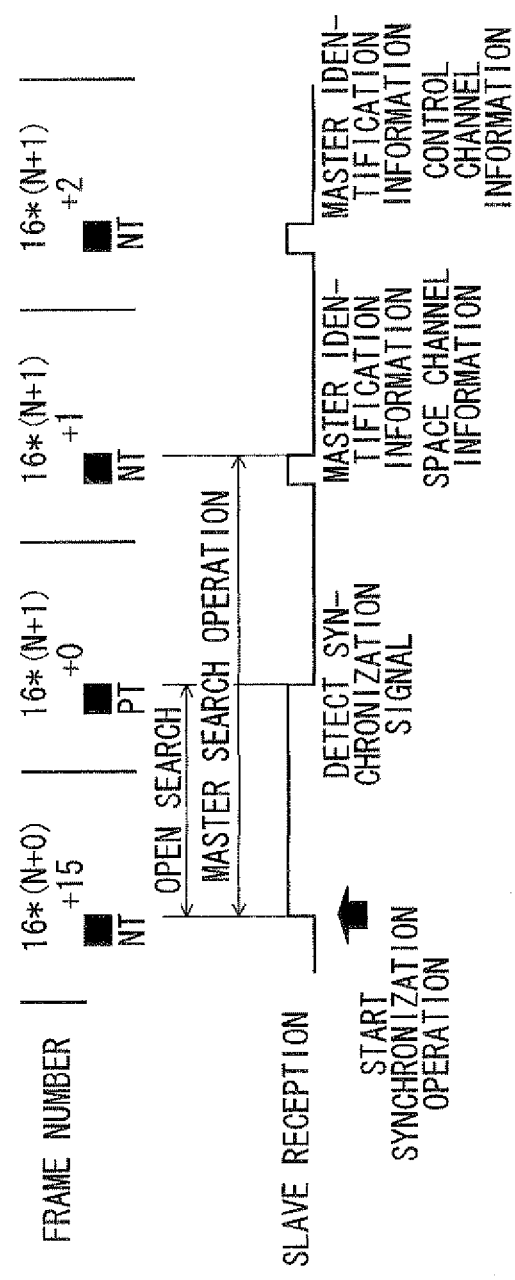
FIG. 13 is a diagram illustrating the operation in which a sensor slave unit illustrated in FIG. 2 establishes synchronization of frames and slots together with a master unit in the case where control data 3, control data 4, and control data 5 are unable to be received.

FIGS. 12 and 13 show examples of the operation from the master unit search operation to the establishment of the synchronization of the frame number and the slot number. The example of FIG. 12 is an example in the case where the reception error does not occur in the data of the slot that has received the master unit ID of the master unit itself in the region of the control data 1. The example of FIG. 13 is an example in which the control data 3, control data 4, and control data 5 are unable to be correctly received, and the synchronization is established based on the reception data of the region of the control data 2 in the slot that has received the master unit ID of the master unit itself and the slot that has received in the next frame in the region of the control data 1. Further, the operation to establish the synchronization only with the data received in the region of the control data 1 in a state where the control data 2, control data 3, control data 4, and control data 5 are unable to be correctly received is the same as the operation until the completion of the frame and slot synchronization operation in the example of the synchronization establishment operation of the phone slave unit 30 illustrated in FIG. 10.

Next, an operation after the synchronization establishment of the sensor slave unit 40 will be described. If the synchronization is completed, the control unit 430 of the sensor slave unit 40 performs measurement of the interfering wave level (that is, carrier sense) by controlling the wireless unit 401 to receive the same frequency as the frequency with which the control signal is received in the slot that is apart for 12 slots from the slot of the control signal while continuing the reception of the slot through which the control signal could have been received in each frame. In the case of transmitting the data to the master unit 20 in the connectionless message communication method, the sensor slave unit 40 transmits the data to the slot that is apart for 12 slots from the slot of the control signal. Hereinafter, this slot is called an uplink connectionless data transmission slot. In two consecutive frames, the uplink connectionless data transmission slot is received, and the interfering wave level of the uplink connectionless data transmission slot is measured. In this case, if the interfering wave level is equal to or lower than a prescribed value, the operation is shifted to the operation to notify the master unit 20 of the state of window in the connectionless message communication method.

Next, the operation for the sensor slave unit 40 to notify the master unit 20 of the state of the window in the connectionless message communication method will be described. The control unit 430 of the sensor slave unit 40 is set to perform transmission of the message to notify of the state of the window with the same frequency as the frequency with which the control signal is received using the uplink connectionless data transmission slot. FIG. 14 shows a signal format in the case of performing message communication in the connectionless message communication method. The signal of the connectionless message communication method has the configuration that is close to the control, signal format shown in FIG. 7, and other control data are connected after control data 1. In FIG. 14, the message transmission regions are described as CLMS 1, CLMS 2, CLMS 3, and CLMS 4. The error detection code 2 is a code for detecting an error of CLMS 1, the error detection code 3 is a code for detecting an error of CLMS 2, the error detection code 4 is a code for detecting an error of CLMS 3, and the error detection code 5 is a code for detecting an error of CLMS 4. The synchronization signal, the control data 1, and the error detection code 1 are the same as those in the control signal format of FIG. 7.

The message to notify of the state of the window is dividedly transmitted to regions of CLMS 1, CLMS 2, CLMS 3, and CLMS 4. Since there is notification of the window state in the connectionless message communication method, the control unit 430 of the sensor slave unit 40 sets the master unit ID in the NT message buffer of the first control data multiplexer 410, and sets a CLMS message, which is composed of a slave unit identification code, a message identifier indicating that this message is a connectionless message, and a message to notify of the state of the window, in CLMS information of the second control data multiplexer 411.

The first control data multiplexer 410 outputs data of the NT message buffer to the frame processing unit 402 to match the transmission timing of the control data 1 of the uplink connectionless data transmission slot. Further, the second control data multiplexer 411 divides the CLMS message and outputs divided CLMS messages to the frame processing unit 402 to match the transmission timing of CLMS 1, CLMS 2, CLMS 3, and CLMS 4 of the uplink connectionless data transmission slot.

The frame processing unit 402 generates a data stream that is transmitted to the region of the control data 1 with the format identification information indicating that the data stream is configured as the format shown in FIG. 14 to transmit the CLMS message and data output from the first control data multiplexer 410, and generates the error detection code 1 depending on the data that is transmitted from the region of the control data 1. Further, the frame processing unit 402 generates the error detection code 2 depending on the data which is transmitted to CLMS 1 that is output to match the transmission timing of CLMS 1 that is output from the second control data multiplexer 411, generates the error detection code 3 depending on the data which is transmitted to CLMS 2 that is output to match the transmission timing of CLMS 2 that is output from the second control data multiplexer 411, generates the error detection code 4 depending on the data which is transmitted to CLMS 3 that is output to match the transmission timing of CLMS 3 that is output from the second control data multiplexer 411, and generates the error detection code 5 depending on the data which is transmitted to CLMS 4 that is output to match the transmission timing of CLMS 4 that is output from the second control data multiplexer 411.

Then, the frame processing unit 402 outputs the data stream to the wireless unit 401 in the order of the synchronization signal, control data 1 (format identification information and data output from the first control data multiplexer 410), error detection code 1, CLMS 1, error detection code 2, CLMS 2, error detection code 3, CLMS 3, error detection code 4, CLMS 4, and error detection code 5 to match the timing of the uplink connectionless data transmission slot. The data stream output to the wireless unit 401 is converted into a wireless signal having the same frequency as the reception frequency of the control signal and is transmitted to the uplink connectionless transmission slot.

If the transmission of the CLMS message is completed, after the next frame, the control unit 430 of the sensor slave unit 40 controls the wireless unit 401 so that only the slot that receives the control signal continues the reception state. If a reception response indicating that the CLMS message including window state information is received from the master unit 20 of the destination is received, the control unit 430 recognizes that the window state information has normally reached the master unit 20, and then outputs the power-off signal to the power supply control unit 441. In this case, the control unit 430 sets a detection condition of the sensor unit 443 so that a power supply on signal is output to the power supply control unit 441 when the window state is changed from the state notified at the previous time, and then outputs the power-off signal. If the power-off signal is input, the power supply control unit 441 outputs a switching signal to turn off the switch 440, and the switch 440 interrupts the power supply to the communication block 400 depending on the switching signal, and the sensor slave unit 40 returns to the normal state.

Next, the operation in which the master unit 20 receives the CLMS message to notify of the window state from the sensor slave unit 40 will be described. The wireless signal that includes the CLMS message transmitted from the sensor slave unit 40 is received in the wireless unit 201 of the master unit 20, and is output to the frame processing unit 202. The frame processing unit 202 extracts the data stream of the regions of the control data 1 and the error detection code 1 from the wireless signal, and determines whether or not the data of the region of the control data 1 is correct data using the data received from the region of the error detection code 1. Then, if the reception signal appears to be configured with the format illustrated in FIG. 14 by the format identification information of the reception signal, the frame processing unit 202 determines whether or not the data of the region of CLMS 1, the data of the region of CLMS 2, the data of the region of CLMS 3, and the data of the region of CLMS 4 are correctly received using the data received in the region of the error detection code 2, the data received in the region of the error detection code 3, the data received in the region of the error detection code 4, and the data received in the region of the error detection code 5, respectively. If the data received in the regions of CLMS 1, CLMS 2, CLMS 3, and CLMS 4 are all correctly received, the frame processing unit 202 operates to combine the data received in the regions of CLMS 1, CLMS 2, CLMS 3, and CLMS 4, and to notify the control unit 230 of the combined data together with the data received in the region of control data 1 as one CLMS message.

If the data received in the region of control data 1 is the NT message of the master unit identification information that is the same as its own ID, the control unit 230, which has received the reception data of the region of control data 1 and the CLMS message, determines that the CLMS message is addressed to the control unit 230 itself, and starts the operation depending on the information notified of by the CLMS message. If the data received in the region of control data 1 is other than the NT message of the master unit identification information that is the same as its own ID, the control unit 230 discards the CLMS message. Further, the control unit 230 determines whether or not the sensor slave unit is the sensor slave unit which an origin of transmission has been registered from the slave unit identification code included in the CLMS message, and if the CLMS message is from the slave unit of non-registration, the control unit 230 discards the CLMS message.

If the CLMS message that notifies of the window state is received from the registered sensor slave unit, the control unit 230 displays the window state of the corresponding sensor slave unit on the display unit 223. Further, the display of the window state is the display on LCD or the display by sound such as ringer, and if it is set to notify of the opening of the window in beep sound, the control unit 230 notifies persons of the opening of the window by making a ringer sound rumble, and operates to stop the ringer by the instruction from the operation unit 224.

Next, the operation to notify of the reception response indicating that the CLMS message including window information has been normally received from the master unit 20 to the sensor slave unit 40 when the master unit 20 receives the CLMS message including the window information from the sensor slave unit 40 will be described. The message to notify of the reception of the CLMS message that notifies of the wind state (hereinafter described as "reception response") is transmitted to the slave unit with the same frequency as the control signal through the slot that transmits the control signal using the format of FIG. 14. That is, the control unit 230 of the master unit 20 sets the CLMS message, which includes a slave unit identification code of the sensor slave unit 40 that is the destination, a message identifier indicating that this message is a connectionless message, and a message to notify of reception response, in the CLMS information of the second control data multiplexer 211 to match the timing of the control slot of the frame to transmit the master unit identification code in the region of control data 1. Accordingly, the second control data multiplexer 211 divides the CLMS message, and outputs the divided CLMS messages to the frame processing unit 402 to match the transmission timing of CLMS 1, CLMS 2, CLMS 3, and CLMS 4 of the control signal.

The frame processing unit 202 generates a data stream that is transmitted to the region of the control data 1 by putting the format identification information indicating that the data stream is configured with the format (FIG. 14) to transmit the CLMS message and data (master identification information) output from the first control data multiplexer 210 on the region of control data 1, and generates the error detection code 1 depending on the data that is transmitted to the region of the control data 1. Further, the frame processing unit 202 generates the error detection code 2 depending on the data which is transmitted to CLMS 1 that is output to match the transmission timing of CLMS 1 that is output from the second control data multiplexer 211, generates the error detection code 3 depending on the data which is transmitted to CLMS 2 that is output to match the transmission timing of CLMS 2 that is output from the second control data multiplexer 211, generates the error detection code 4 depending on the data which is transmitted to CLMS 3 that is output to match the transmission timing of CLMS 3 that is output from the second control data multiplexer 211, and generates the error detection code 5 depending on the data which is transmitted to CLMS 4 that is output to match the transmission timing of CLMS 4 that is output from the second control data multiplexer 211.

Then, the frame processing unit 202 outputs the data stream to the wireless unit 201 in the order of the synchronization signal, the above-described control data 1 (format identification information and master unit identification information output from the first control data multiplexer 210), the error detection code 1, the CLMS 1, the error detection code 2, the CLMS 2, the error detection code 3, the CLMS 3, the error detection code 4, the CLMS 4, and the error detection code 5 to match the timing of the control slot. The data stream output to the wireless unit 401 is converted into a wireless signal having the frequency for the control signal and is transmitted to the control slot. If the transmission of the CLMS message is completed, the control unit 230 controls to return to the state where the control signal illustrated in FIG. 11 is transmitted to the control slot after the next frame.

Next, using FIGS. 15, 16, and 17, the transmission and reception switching operation of each slot when there is notification of the window state change will be described. In the following description, the frame having the frame number N illustrated in the drawing is described as frame N, and the slot having the slot number N is described as Slot: N.

Figure 15:
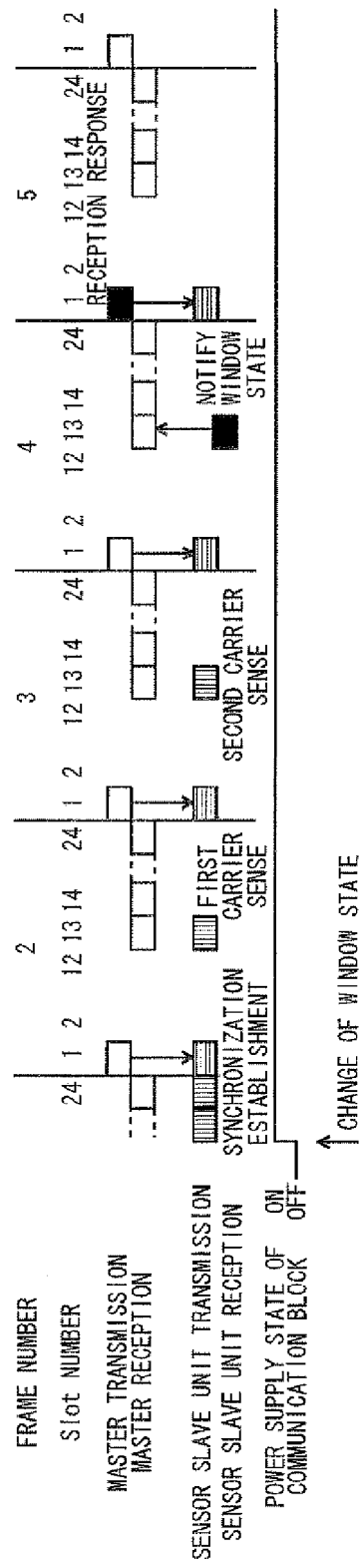
FIG. 15 is a diagram illustrating an example of the operation in which a sensor slave unit illustrated in FIG. 2 establishes synchronization with a master unit through change of a window state of the sensor slave unit and notifies the master unit of the window state through a CLMS message.

FIG. 15 is a diagram illustrating an example of the operation in which the above-described sensor slave unit 40 detects the change of the window state, supplies the power to the communication block 400, establishes the synchronization with the master unit 20 that transmits the control signal to Slot: 1, notifies the master unit 20 of the window state by the CLMS message, and power supply to the communication block 400 is interrupted. In the example of FIG. 15, the sensor slave unit 40 starts the operation for synchronization by supplying the power to the communication block 400 if the window state is changed at a certain time before frame 1, and starts the consecutive reception (open search). If the synchronization signal of the reception data is detected, the sensor slave unit 40 acquires the master unit identification information or the like by the following data, confirms whether or not the control signal is truly from the master unit, and establishes the synchronization if the control signal is from the registered master unit. In the example of FIG. 15, the synchronization with the control signal of the master unit is established with Slot: 1 of frame 2.

Then, the sensor slave unit 40 selects Slot: 13 that is apart for 12 slots, which is the number of slots that correspond to a half of the number of slots accommodated in the frame, from the slot that has received the control signal as the slot to perform the transmission of the CLMS message. Further, the sensor slave unit 40 transmits the CLMS message to notify of the window state to Slot: 13 of frame 4 by performing carrier sense to confirm the existence/nonexistence of the interfering waves with respect to Slot: 13 of frame 2 and frame 3.

Further, the sensor slave unit 40 continues the reception of the control signal of the master unit with. Slot: 1 of frame 2 and the control signal with Slot: 1 of the frame after the synchronization establishment, maintains the synchronization with the master unit 20, and waits for the reception response to notify of the reception of the CLMS message. In the example of FIG. 15, the sensor slave unit 40 receives the reception response from the master unit 20 with frame 5, and stops the operation to notify of the window state change to interrupt the power supplied to the communication block 400. Further, both the reception frequency during the carrier sense with Slot: 13 and the transmission frequency of the CLMS message are the same as the reception frequency of the control signal with Slot: 1.

Next, using FIG. 16, the operation in the case where the communication of the CLMS message that notifies of the window state does not succeed at once will be described. FIG. 16 illustrates an example of the operation to notify of the window state change through retransmission of the CLMS message to notify of the window state. In this example, the sensor slave unit 40 retransmits the CLMS message to notify of the window state if the reception response is unable to be received from the master unit within four frames after the CLMS message to notify of the window state is transmitted. If the CLMS message to notify of the window state is received, the master unit 20 transmits the reception response to continue with the frame afterwards.

Figure 16:
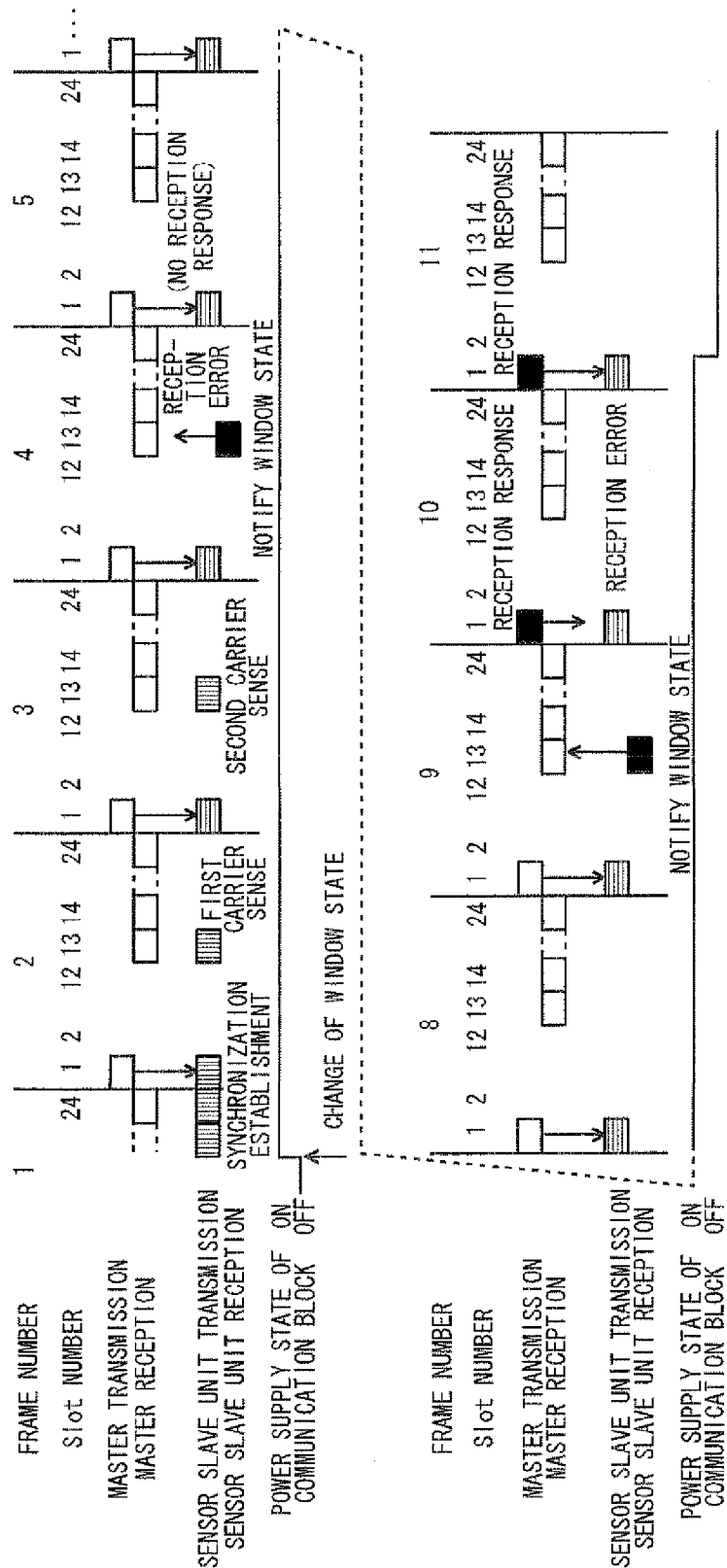
FIG. 16 is a diagram illustrating an example of the operation in which a sensor slave unit illustrated in FIG. 2 establishes synchronization with a master unit through change of a window state of the sensor slave unit and notifies the master unit of the window state through repetition of a CLMS message.

In the example of FIG. 16, the operation to frame 5 that initially transmits the CLMS message after the window state of the sensor slave unit 40 is changed is the same as that in FIG. 15, and the explanation thereof will not be repeated. In the example of FIG. 16, the operation is the operation in the case where the CLMS message that is transmitted to Slot: 13 of frame 4 does not reach the master unit 20. If the CLMS message does not reach the master unit 20, the master unit 20 transmits a normal control signal to the next frame 5. In a period from frame 5 to frame 9 after the transmission of the CLMS message, the sensor slave unit 40 waits for the reception response from the master unit. If the reception response is unable to be received even from Slot: 1 of frame 9, the sensor slave unit 40 retransmits the CLMS message to Slot: 13 of frame 9.

If the CLMS message that is transmitted to Slot: 13 of frame 9 is normally received in the master unit 20, the master unit 20 starts the transmission of the reception response in the transmission slot of the control signal, that is, Slot: 1, in the frame 10. At this time, in consideration of the occurrence of the reception error, in order to improve the communication quality, the master unit 20 operates to transmit the reception response to the frame that transmits the NT message multiple times, and in the example of FIG. 16, the master unit 20 transmits the reception response with frame 10. and frame 11.

The example of FIG. 16 shows that the reception error occurs in Slot: 1 of frame 10 in the sensor slave unit 40 and the reception response that is transmitted from the master unit 20 is received in Slot: 1 of frame 11. The sensor slave unit 40 that has received the reception response with Slot: 1 of frame 11 recognizes that the information of the window state change is received in the master unit 20 through the reception response, stops the operation to notify of the window state change, and interrupts the power supply to the communication block 400. Further, the reception frequency during the carrier sense in Slot: 13 and the transmission frequency of the CLMS message are the same as the reception frequency of the control signal in Slot: 1. For example, even after the sensor slave unit 40 operates to notify the master unit 20 of the window state in the above-mentioned connectionless communication method, if the sensor slave unit 40 does not receive a response which indicates normally received the window state from the master unit 20, the sensor slave unit 40 operates to transmit the window state again by switching to the connection message communication method.

Next, using FIG. 17, the operation in the case where the communication of the CLMS message to notify of the window state does not succeed and there is notification of the window state in the master unit 20 through shifting to the connection message communication method will be described. If the reception response is unable to be received from the master unit even in the transmission of the CLMS message of the number of times decided beforehand and if the interfering wave level of the uplink connectionless data transmission slot detected by the carrier sense is high and the CLMS message is unable to be transmitted, the sensor slave unit 40 starts the operation to transmit the window state gain by the connection message communication method.

In this case, in the same manner as the interactive communication between the above-described phone slave unit 30 and the master unit 20, the sensor slave unit 40 establishes the interactive wireless link, performs negotiation of a higher layer such as a network layer, and notifies the master unit 20 of the window state in the connection message communication method Which performs message communication of an application layer that notifies of the sensor state. FIG. 17 shows an example of operation in the case where the sensor slave unit 40 and the master unit 20 establish the interactive wireless link, start the data link layer using an interactive wireless communication path, perform negotiation of the network layer, and notify of the window state change. The operation in which the window state is changed, the power is supplied to the communication block 400, and the CLMS message to notify the window state is transmitted multiple times is the same as that illustrated in FIG. 16, and thus this will not be repeated in FIG. 17. FIG. 17 shows the operation in a state where the CLMS message is transmitted a prescribed number of times and the reception response is unable to be received within a prescribed time.

FIG. 17 shows an example to start the wireless communication by the connection message communication method with frame 2. The sensor slave unit 40 selects Slot: 2 for reception among reception slots (that is, Slot: 2 to slot: 12) except for Slot: 1 that performs the reception of the control signal of the master unit 20 of frame 2, selects Slot: 14 for transmission that is apart for 12 slots from slot: 2, and establishes the interactive wireless link using Slot: 2 for reception and Slot: 14 for transmission 14 to perform the communication. At this time, sensor slave unit 40 selects the frequency that is used for communication among communication frequencies of which the control signal notifies. Further, the frame when the standby frequency of the master unit 20 coincides with the selected frequency is determined as the frame that transmits the wireless link establishment message, and before the transmission of the wireless link confirmation demand message, the carrier sense is performed with the selected frequency in the selected transmission and reception slot.

FIG. 17 shows the operation in the case where the master unit 20 selects the standby frequency with frame 4, and the sensor slave unit 40 transmits the wireless link establishment demand to Slot: 14 of frame 4 through performing of the carrier sense of Slot: 2 and Slot: 14 from frame 2. Further, the sensor slave unit 40 detects the interfering waves by the carrier sense, and if it is determined that the transmission is not possible, it controls to change at least one of the communication frequency and the slot, to newly perform carrier sense, and to transmit the wireless link establishment demand message.

If the wireless link establishment demand message is received from the standby slot in FIG. 17, Slot: 14), the master unit 20 fixes the reception frequency of the slot (in FIG. 17, Slot: 14) that has received the wireless link establishment demand message to the frequency that has received the wireless link establishment demand message even with respect to the following frame, and transmits a wireless link establishment response message to the slot that is apart for 12 slots from the slot that has received the wireless link establishment demand message. In FIG. 17, the wireless link establishment response message is transmitted to Slot: 2 of frame 5.

If the wireless link establishment response message is received, the sensor slave unit 40 shifts to the wireless link establishment state, stops the reception of the control slot, and performs transmission and reception in slots (Slot: 2 and Slot: 14) for communication. Further, if the wireless link establishment response message is unable to be received, in the same manner as the case where it is determined that the transmission for the carrier sense is not possible, the sensor slave unit 40 operates to newly work again from the carrier sense through changing of at least one of the communication frequency and the slot.

In FIG. 17, the sensor slave unit 40 receives the wireless link establishment response message of frame 5, shifts to the wireless link establishment state, and performs transmission and reception in the slot for communication after frame 6. Thereafter, the sensor slave unit 40 and the master unit 20 perform the wireless communication using Slot: 2 and Slot: 14, perform start of the data link layer for retransmission control and start of the network layer, and perform transmission and reception of the message to notify of the window state and the response. Then, if the notification of the window state is completed, the sensor slave unit 40 performs stopping of the network layer, stopping of the data link layer, and the opening of the wireless link, and ends the wireless communication. Then, the sensor slave unit 40 interrupts the power supply to the communication block 400. FIG. 17 shows that the communication from frame 6 to Slot: 14 of frame N+1 is performed, performs the start of the data link layer, start of the network layer, a message to notify of the window state, transmission and reception of the response, stopping of the network layer, stopping of the data link layer, and the opening of the wireless link, and then interrupts the power supply to the wireless communication block 400.

Next, a description will be made of an operation when the master unit 20 is unable to be notified of a window state even using the connection message communication method. When the master unit 20 is unable to be notified of a window state even using the connection message communication method, the control unit 430 sets time information in the timer unit 442 such that a power-on signal is output to the power supply control unit 441 after a predetermined time has elapsed, and then outputs a power-off signal to the power supply control unit 441. When the power-off signal is input, the power supply control unit 441 outputs a switching signal for turning off the switch 440, and the switch 440 cuts off power supply to the communication block 400 such that the sensor slave unit 40 returns to a normal state. The timer unit 442 of the sensor slave unit 40 is driven by the battery at all times, the power-on signal is output from the timer unit 442 to the power supply control unit 441 after the predetermined time has elapsed, power is supplied to the communication block 400, and the control unit 430 starts an operation of notifying the master unit 20 of a window state again.

Next, a description will be made of an operation in which the master unit 20 notifies the phone slave unit 30 that a CLMS message including the window state sent from the sensor slave unit 40 has been received. The notification from the master unit 20 to the phone slave unit 30 uses a PT message of the control signal which is transmitted with the control slot in the same manner as the notification of the outside line reception message. That is, when the CLMS message to notify of the window state is received from the sensor slave unit 40, the control unit 230 of the master unit 20 writes the PT message (hereinafter, referred to as a window state notification message) to notify of the window state of the sensor slave unit 40 in the PT message buffer of the first control data multiplex unit 210. This window state notification message is output to the wireless unit 201 at the timing when the frame number is of 16 multiples and is transmitted.

On the other hand, the phone slave unit 30 performs the reception at the timing when the frame number is of 16 multiples in the idle state, and the window state notification message is received by the wireless unit 301 in the same manner as the outside line reception message and is output to the frame processing unit 202. The frame processing unit 202 extracts data received from the region of the control data 1 illustrated in FIG. 6, that is, the window state notification message, and outputs the extracted window state notification message to the control unit 330. When the window state notification message is received, the control unit 330 controls the display unit 323 so as to display the window state change by making a ringer sound rumble or the like. In addition, the window state notification message is transmitted with a portion of the control signal as the PT message and thus can also be received by the sensor slave unit 40 which waits for a reception response to be received. In a case where the window state notification message is received before a reception response is received from the master unit 20, the sensor slave unit 40 may perform control so as to cut off power supplied to the communication block 400 and to return to a normal state in the same manner as a case of receiving the reception response.

Next, a description will be made of an operation where the sensor slave unit 40 notifies the master unit 20 of a battery voltage state. The battery voltage detection unit 423 of the sensor slave unit 40 has a function of detecting a battery voltage and has a threshold value for determining whether or not a notification of information regarding the battery voltage is sent. The first RAM 445 which is operated by the battery of the sensor slave unit 40 at all times is provided with an area for writing information indicating master unit search operation circumstances, an area for writing information indicating a connectionless communication failure, an area for writing information regarding a battery voltage, and the like. In the area for writing information regarding a battery voltage, information regarding a battery voltage when the battery voltage detection unit 423 detects a battery voltage, for example, an index reflecting a voltage value of a measurement result, information indicating that a measured battery voltage is lower than a predetermined threshold value, or information indicating whether or not sending of a notification to the control station is completed is stored.

The timer unit 442 which is driven by the battery of the sensor slave unit 40 at all times is operated so as to output a power-on signal to the power supply control unit 441 in a predetermined cycle (sleep canceling cycle) separately from the timer control in a case where the notification of the above-described window state change is unable to be sent. When the power-on signal is output to the power supply control unit 441, power is supplied to the communication block 400, and thus an operation of the control unit 430 is started.

When a cycle timer expiration of the timer unit 442 is recognized as a factor of the power-on, the control unit 430 of the sensor slave unit 40 starts the battery voltage detection unit 423 so as to detect a battery voltage. In addition, the control unit 430 is operated so as to notify the master unit 20 of information regarding the detected battery voltage with the CLMS message. That is, in the same manner as the case of sending the CLMS message of the window state notification, first, the master unit search is started, and synchronization with the master unit 20 is performed by supplementing the control signal. Next, information regarding a battery voltage, for example, information indicating a battery voltage reduction in a case where the battery voltage is reduced by a predetermined amount or more with respect to the previously measured value, or information indicating that the batteries are required to be exchanged in a case where a battery voltage measurement value is equal to or less than a predetermined threshold value, is transmitted to the master unit 20 using the CLMS message.

In addition, after the information regarding a battery voltage is transmitted once using the CLMS message, the control unit 430 outputs the power-off signal to the power supply control unit 441 without waiting for a response from the master unit 20 unlike in the case of sending a message to notify of the window state. When the power-off signal is input, the power supply control unit 441 outputs a switching signal for turning off the switch 440, the switch 440 cuts off power supply to the communication block 400 in response thereto, and the sensor slave unit 40 returns to a normal state.

When the master unit 20 is notified of the information regarding a battery voltage from the sensor slave unit with the CLMS message, the master unit 20 updates a battery state of the sensor slave unit displayed on the display unit 223, and displays the latest battery voltage information on the display unit 223. In addition, in a case where information regarding a battery voltage is not received from the sensor slave unit 40 during a specific time period, the control unit 230 of the master unit controls the display unit 223 so as to perform display to notify of state abnormality of the sensor slave unit 40.

As described above, in a case of the information regarding a battery voltage, when the sensor slave unit 40 transmits the information once using the CLMS message, the sensor slave unit 40 cuts of power supply without confirming whether or not the information is received by the master unit 20. In a case of the information regarding a. battery voltage, a retransmission operation of the CLMS message is not directly performed, and thus power consumption is suppressed. Since the information regarding a battery voltage has lower emergency than the window state notification, when the timer unit 442 is started due to the next period timer expiration, information regarding the latest battery voltage may be sent based on a detection result at that time even if reception of the information is unable to be confirmed. Thereby, it is possible to prevent power consumption from increasing in order to send the information regarding a battery voltage to the master unit 20. In a case of sending the information using the CLMS message in this way, by switching whether or not to retransmit the CLMS message several times depending on emergency and importance of information, it is possible to suppress wasteful power consumption and increase the battery lifetime.

In addition, the frequency of a clock which is output by the first clock generation unit 446 which supplies the clock to the timer unit 442 is preferably small. The timer unit 442 may include a counter which performs count-up using an input clock, a storage portion which stores a comparative value, and a comparator which outputs a timer expiration signal when the comparative value is the same as a counter value, but, in a case of measuring the same time, power consumption increases depending on an input clock number, and thus it is possible to reduce power consumption in the timer unit as the clock frequency is smaller.

Next, a description will be made of a method of controlling an operation of the sensor slave unit 40 by using the first RAM 445. The first RAM 445 is directly supplied with power from the power supply unit 444, and the contents of the first RAM 445 are maintained even in the standby state where power supply to the communication block 400 is cut off. The control unit 430 reads information which is necessary for the next starting (when transition to the operation state from the standby state) among the respective pieces of information maintained in the second RAM 421 before transition to the standby state from the operation state, and writes this information necessary for the next starting in the first RAM 445. After the writing of the information in the first RAM 445 is completed, a power-off signal is output to the power supply control unit 441, power supply to the communication block 400 is cut off, and the standby state arrives. Thereafter, when a power-on signal is output to the power supply control unit 441, power is supplied to the communication block 400, and the control unit 430 starts an operation, the control unit 430 can understand a state before transition to the standby state by reading the first RAM 445.

Next, detailed application examples of the first RAM 445 will be described. The first application example is an example of being used for a resynchronization operation when a master unit is not found in an operation where the sensor slave unit 40 establishes synchronization with the master unit 20. In a case where the sensor slave unit 40 communicates with the master unit 20, first, a master unit search operation is started in order to receive a control signal transmitted by the master unit 20. In the master unit search operation, when the sensor slave unit 40 can find out the master unit 20 thereof and shift to the frame and slot synchronization operation, information indicating search success is written in the area of the first RAM 445 for information indicating master unit search operation circumstances. On the other hand, when the sensor slave unit 40 performs the master unit search operation for a specific time with all the available frequencies and is unable to detect a control signal of the master unit 20 thereof, information indicating master unit search operation failure is written in the area of the first RAM 445 for information indicating master unit search operation circumstances. In addition, the control unit 430 sets time information in the timer unit 442 so as to output the power-on signal to the power supply control unit 441 after a preset time has elapsed, and outputs the power-off signal to the power supply control unit 441.

In addition, when the time according to the set value has elapsed, the power-on signal is output to the power supply control unit 441 from the timer unit 442, power is supplied to the communication block, the control unit 430 is started, and the control unit 430 starts the master unit search operation again in order to receive the control signal transmitted by the master unit 20. At this time, before the search operation, the control unit 430 reads the information from the area of the first RAM 445 for information indicating master unit search operation circumstances, and performs control so as to shorten the time limit of the present master unit search operation in a case where information indicating master unit search operation failure is written in the area of the first RAM 445 for information indicating master unit search operation circumstances. In other words, if a state where the control signal of the master unit is unable to be received continues, control is performed so as to shorten time for the master unit search as compared with that of the previous time. In addition, as information indicating the master unit search operation failure, there is also a method of using the number of continuous failures, and, in this case, each time the master unit search operation failure is repeated, the search time may be shortened and a power-off time of the communication block 400 may be lengthened, thereby reducing power consumption.

The second application example is a method of preserving information regarding message communication failure in a case where a message is unable to be transmitted after the sensor slave unit 40 establishes synchronization with the master unit 20. In a case of notifying the master unit 20 of a window state change, first, the sensor slave unit 40 is operated so as to transmit a window state notification using the connectionless message communication method and wait for a reception response from the master unit 20. In addition, in a case where the master unit 20 is unable to be notified of the window state using the connectionless message communication method, switching to the connection message communication method is performed, and then the window state notification is performed.

The sensor slave unit 40 performs the carrier sense in order to start the connection message communication and selects a slot and a frequency. In a case where available slot and frequency are not found yet even if the carrier sense is repeatedly performed for a specific number of times or for a specific time, information indicating connection message communication failure caused by there being no vacant channel is written in the area of the first RAM 445 for connection message failure information. In addition, in this case as well, the control unit 430 sets time information in the timer unit 442 so as to output the power-on signal to the power supply control unit 441 after a preset time has elapsed, and outputs the power-off signal to the power supply control unit 441.

In addition, in a case where the connection message communication is disconnected from the master unit 20 for the reasons such as a busy master unit or communication quality deterioration after wireless link for the connection message communication is established and before a message indicating the window state change is sent, information indicating connection message communication failure for the reasons such as the busy master unit or the communication quality deterioration is written in the area of the first RAM 445 for connection message failure information. In addition, in this case as well, the control unit 430 sets time information in the timer unit 442 so as to output the power-on signal to the power supply control unit 441 after a preset time has elapsed, and outputs the power-off signal to the power supply control unit 441.

Further, when the time according to the set value has elapsed, the power-on signal is output to the power supply control unit 441 from the timer unit 442, power is supplied to the communication block, the control unit 430 is started, and the control unit 430 transmits a message indicating the window state to the master unit 20 again. At this time, first, the control unit 430 is operated so as to transmit a window state notification using the connectionless message communication method and wait for a reception response from the master unit 20 in the same manner as the previous time. Further, in a case where the master unit 20 is unable to be notified of the window state using the connectionless message communication method, the control unit 430 reads the information from the area of the first RAM 445 for connection message failure information, and is operated so as to notify of the window state with the connection message communication by changing the time limit of a sequence of the connection message communication or the number of retries depending on the previous failure circumstances. For example, in a case where the information stored in the area of the first RAM 445 for connection message failure information indicates connection message communication failure caused by there being no vacant channel, control is performed so as to shorten the number of retries or the time limit for selecting a slot and a frequency.

In addition, in this case as well, as information indicating the failure, there is also a method of using the number of continuous failures caused by there being no vacant channel, and, a power-off time of the communication block 400 may be lengthened depending on the number where no vacant channel continues, thereby reducing power consumption.

As above, the first application example and the second application example regarding the use of the first RAM 445 have shown an example of the case where communication with the master unit 20 does not normally finish for the reasons such as poor synchronization with the master unit, no vacant channel for communication, and a busy master unit in an operation where the sensor slave unit 40 communicates with the master unit 20. As shown in these examples, one of methods of using the first RAM 445 has an effect of preventing the battery from being consumed due to repetition of retries when communication abnormality occurs for the same reason, by storing communication circumstances between the sensor slave unit 40 and the master unit 20 and by changing the number of retries or the time limit of each operation, or by changing a power-off time of the communication block 400, during the communication depending on the previous communication circumstances. In addition, in order to prevent the battery consumption, by the use of the first RAM 445, an operation may be performed so as to stop retransmission in a case where the number of retransmissions arrives at a specific value regardless of reasons of communication abnormality.

Further, as the third application example, information regarding a battery voltage may be written in the first RAM 445. When the sensor slave unit 40 is started, the battery voltage detection unit 423 detects a battery voltage and temporarily stores information regarding the battery voltage in the second RAM 421. Before the present communication finishes and transition to the standby state is performed, the control unit 430 writes the information regarding a battery voltage which has been read from the second RAM 421 in the first RAM 445. In addition, the control unit 430 sets time information in the timer unit 442 so as to output the power-on signal to the power supply control unit 441 after a preset time has elapsed, and outputs the power-off signal to the power supply control unit 441.

In addition, when the time according to the set value has elapsed, the power-on signal is output to the power supply control unit 441 from the timer unit 442, and the master unit search operation is started. Along therewith, the control unit 430 of the sensor slave unit 40 reads the information from the first RAM 445, and determines whether a result of detecting a voltage the present time and a result of detecting a voltage the previous time are the same or different. Further, the control unit 430 notifies the master unit 20 of the information regarding a battery voltage only in a case where the present detection result is different from the previous detection result.

When notified of the information regarding a battery voltage from the sensor slave unit 40, the control unit 230 of the master unit 20 updates a battery state of the sensor slave unit displayed on the display unit 223, and displays the latest battery voltage information on the display unit 223. In addition, in a case where information regarding a battery voltage is not received from the sensor slave unit 40 during a specific time period, the control unit 230 of the master unit 20 controls the display unit 223 so as to perform display to notify of state abnormality of the sensor slave unit 40.

In this way, the sensor slave unit 40 notifies the master unit 20 of the information regarding a battery voltage only in a case of being different from the previous detection result, and thereby power consumption of the sensor slave unit 40 is suppressed accordingly. Further, information indicating whether or not sending of a notification of the same information as the information regarding a battery voltage to a control station which is the master unit 20 is completed may be written in the first RAM 445. In a case where the information indicating that the notification is completed is written, an operation of notifying the master unit 20 of the information regarding a battery voltage may not be performed.

Although, in the above description, a wireless phone and a wireless sensor for notifying of door opening/closing have been exemplified as the embodiments of the present invention, the present invention is not limited thereto, and is applicable to devices of notifying a control station of a variety of events using wireless communication, such as a variety of notification devices which are dependent on the control station and are operated, emergency buttons, nurse call, and devices (for example, smart grids or energy management systems) monitoring operation states or power consumption of various electrical apparatuses.

The present application is based upon and claims the benefit of priority of Japanese Patent Application No. 2011-241900 filed on Nov. 4, 2011, the contents of which are incorporated herein by reference in its entirety.

The present invention is useful, for example, for a wireless communication apparatus and a wireless communication system which can be applied to a wireless sensor, and can reduce the power consumption of a tributary station.

What is claimed is:

1. A wireless communication apparatus which operates in tributary to a control station that performs a time division multiplex communication, the wireless communication apparatus comprising:
a switch unit that switches on/off a power supplied from a battery;
a power supply control unit that controls the switch unit;
a RAM (Random Access Memory) to which power is constantly supplied from the battery;
a wireless unit that receives a power supplied through the switch unit and performs a wireless communication with the control station;
a control unit that receives the power supplied through the switch unit; and
a timer unit that measures a time period depending on a given setting, wherein
when notification of a message with respect to the control station has failed after the establishment of the synchronization with the control station, the control unit writes information indicating non-transmission of the message in the RAM and then outputs a signal of a power supply off to the power supply control unit,
the power supply control unit turns off the switch unit upon receiving the signal of the power supply off,
when the switch unit is turned on to supply the power to the control unit through the switch unit, the control unit performs a transmission operation of the message to the control station and reduces the number of retries of the transmission of the message in accordance with the information indicating the non-transmission of the message stored in the RAM,
when writing the information indicating non-transmission of the message in the RAM, the control unit sets a standby time for a retransmission control in the timer unit, and then outputs the signal of power supply off to the power supply control unit,
the timer unit notifies the power supply control unit of timer expiration when the set standby time elapses, and the power supply control unit turns on the switch unit upon receiving a notification of the timer expiration to operate to notify the control station of the message again, and
when the transmission of the message has failed multiple times, the control unit reduces the number of retries of the transmission of the message depending on the number of failures.

2. A wireless communication apparatus which operates in tributary to a control station that performs a time division multiplex communication, the wireless communication apparatus comprising:
a switch unit that switches on/off a power supplied from a battery;
a power supply control unit that controls the switch unit;
a RAM (Random Access Memory) to which power is constantly supplied from the battery;
a wireless unit that receives power supplied through the switch unit and performs a wireless communication with the control station; and
a control unit that receives the power supplied through the switch unit, wherein
when the control unit is supplied with the power through the switch unit in accordance with turning-on operation of the switch unit, the control unit starts the wireless unit, and when synchronization for performing the time division multiplex communication with the control station is established, the control unit notifies the control station of a message and writes information indicating that a notification of the message is completed in the RAM, and then outputs the signal of power supply off to the power supply control unit, but when the synchronization with the control station is not established, the control unit writes information indicating that an establishment of the synchronization has failed in the RAM, and then outputs the signal of power supply off to the power supply control unit, and
when the information indicating that the establishment of the synchronization has failed is written in the RAM in an operation by the control unit to establish the synchronization with the control station, the control unit shortens a limit time until it is considered that the establishment of the synchronization has failed in comparison with a case where information indicating a normal end is written in the RAM.

3. The wireless communication apparatus according to claim 1,
wherein
the control unit sets a standby time for predetermined retransmission control in the timer unit when a communication with the control station has failed, and
the power supply control unit turns on the switch unit upon receiving a notification of the timer expiration from the timer unit to operate to communicate with the control station again.

4. The wireless communication apparatus according to claim 3, wherein when a communication with the control station has failed, the control unit writes information indicating the number of starts for retransmission in the RAM and determines the standby time for the retransmission control depending on the number of starts for the retransmission.

5. The wireless communication apparatus according to claim 3, wherein the control unit operates to stop the retransmission control when the number of starts for the retransmission reaches a predetermined number of times.

6. The wireless communication apparatus according to claim 3, further comprising
a battery voltage detection unit that detects a battery voltage of the battery, wherein
the control unit detects the battery voltage while the power is supplied, and notifies the control station of information on the battery voltage.

7. The wireless communication apparatus according to claim 6, wherein
the control unit sets a standby time until a predetermined monitoring time of the battery voltage in the timer unit,
the timer unit notifies the power supply control unit of a timer expiration when the standby time elapses, and
the power supply control unit turns on the switch unit upon receiving a notification of the timer expiration to supply the power through the switch unit.

8. The wireless communication apparatus according to claim 6, wherein
the control unit has a threshold value to determine whether or not to notify of the information on the battery voltage, and
the control unit notifies the control station of the information on the battery voltage when the battery voltage becomes equal to or lower than the threshold value.

9. The wireless communication apparatus according to claim 8, wherein
when the notification of the information on the battery voltage to the control station is completed, the control unit writes information indicating that the notification of the information on the battery voltage to the control station is completed in the RAM, and
if the information indicating that the notification of the information on the battery voltage to the control station is completed is not written in the RAM, the control unit notifies the control station of the information on the battery voltage and an operation to detect the battery voltage.

* * * * *